United States Patent
Nelson

(10) Patent No.: US 8,139,099 B2
(45) Date of Patent: Mar. 20, 2012

(54) GENERATING REPRESENTATIVE STILL IMAGES FROM A VIDEO RECORDING

(75) Inventor: Steve Nelson, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 925 days.

(21) Appl. No.: 12/168,612

(22) Filed: Jul. 7, 2008

(65) Prior Publication Data
US 2010/0002066 A1    Jan. 7, 2010

(51) Int. Cl.
*H04N 7/14* (2006.01)
(52) U.S. Cl. .................. 348/14.08; 348/14.01
(58) Field of Classification Search ............ 348/14.01, 348/14.08; 370/259–261, 263, 265, 351–356; 709/204, 223
See application file for complete search history.

(56) References Cited

U.S. PATENT DOCUMENTS

| | | | |
|---|---|---|---|
| 5,535,063 A | 7/1996 | Lamming | |
| 6,239,801 B1 | 5/2001 | Chiu et al. | |
| 7,167,191 B2 | 1/2007 | Hull et al. | |
| 7,260,771 B2 | 8/2007 | Chiu et al. | |
| 7,495,795 B2 * | 2/2009 | Graham et al. | 358/1.18 |
| 2005/0180341 A1 * | 8/2005 | Nelson et al. | 370/260 |
| 2006/0251384 A1 | 11/2006 | Vronay et al. | |

* cited by examiner

*Primary Examiner* — Tuan Nguyen

(57) ABSTRACT

Computer-readable media having corresponding apparatus and methods embodies instructions executable by a computer to perform a method comprising: receiving a recording, wherein the recording includes a video file, and a plurality of event records each representing a respective event in the recording, wherein each event record includes a timestamp representing a time of the event in the recording, and an image corresponding to the event; selecting a section of the recording; and providing a representative image for the selected section of the recording, including determining, based on the timestamps, whether any of the events are associated with the selected section, selecting the image corresponding to one of the one or more events when one or more events are associated with the selected section, and generating the representative image based on the video file when no events are associated with the selected section.

15 Claims, 24 Drawing Sheets

Raw Command File 412

*Event Index File 2200*

| Event Record 2202 |
|---|
| Time Stamp 2210 |
| Format 2212 |
| Width 2214 |
| Height 2216 |
| Attribute 2218 |
| Image Data 2220 |

⋮

Thumbnail Index File 1718

```
┌─────────────────────────────┐
│     Event Record 2402       │
│  ┌───────────────────────┐  │
│  │   Time Stamp 2410     │  │
│  ├───────────────────────┤  │
│  │     Format 2412       │  │
│  ├───────────────────────┤  │
│  │     Width 2414        │  │
│  ├───────────────────────┤  │
│  │     Height 2416       │  │
│  ├───────────────────────┤  │
│  │    Attribute 2418     │  │
│  ├───────────────────────┤  │
│  │   Image Data 2420     │  │
│  └───────────────────────┘  │
└─────────────────────────────┘
```

GENERATING REPRESENTATIVE STILL IMAGES FROM A VIDEO RECORDING

BACKGROUND

The present disclosure relates generally to media processing. More particularly, the present disclosure relates to generating representative still images from a video recording.

Video conferencing is an essential tool within many corporations for sharing and distributing information. The meetings held online can take many forms, including company-wide announcements, technical discussions between engineering groups, training seminars, code reviews, and the like. Many video conferencing systems offer the ability to record videoconferences for later playback. In addition to recording audio and video, many systems also record media streams such as remote desktops, document cameras, whiteboards, document annotations, and document sharing. Recorded meetings provide a number of benefits, such as giving those who could not attend the ability to replay the meeting to see exactly what happened in the meeting. In addition, the recorded meeting is a good reference to review issues and action items discussed in the meeting.

While some may have the time to view the recorded meeting from start to finish, others may need a way to quickly access the sections of the recorded meeting that are most relevant to the task at hand.

SUMMARY

In general, in one aspect, an embodiment features computer-readable media embodying instructions executable by a computer to perform a method comprising: receiving a recording, wherein the recording includes a video file, and a plurality of event records each representing a respective event in the recording, wherein each event record includes a timestamp representing a time of the event in the recording, and an image corresponding to the event; selecting a section of the recording; and providing a representative image for the selected section of the recording, including determining, based on the timestamps, whether any of the events are associated with the selected section, selecting the image corresponding to one of the one or more events when one or more events are associated with the selected section, and generating the representative image based on the video file when no events are associated with the selected section.

Embodiments of the computer program can include one or more of the following features. In some embodiments, providing a representative image for the selected section of the recording comprises: assigning a rank to each of the one or more events according to a ranking scheme; and selecting, as the representative image, the image corresponding to the event having the highest rank. In some embodiments, the recording represents a videoconference having a plurality of participants. In some embodiments, generating the representative image based on the video file comprises: selecting one of the participants; and generating the representative image based on a section of the video file contributed by the selected participant. In some embodiments, selecting the one of the participants comprises at least one of: selecting the one of the participants based on roles of the participants in the videoconference; and selecting the one of the participants based on audio activity levels of the participants.

In general, in one aspect, an embodiment features an apparatus comprising: an input module adapted to receive a recording, wherein the recording includes a video file, and a plurality of event records each representing a respective event in the recording, wherein each event record includes a timestamp representing a time of the event in the recording, and an image corresponding to the event; a section module adapted to select a section of the recording; and a thumbnail module adapted to provide a representative image for the selected section of the recording, including a timestamp module adapted to determine, based on the timestamps, whether any of the events are associated with the selected section, a selection module adapted to select the image corresponding to one of the one or more events when one or more events are associated with the selected section, and an image module adapted to generate the representative image based on the video file when no events are associated with the selected section.

Embodiments of the apparatus can include one or more of the following features. In some embodiments, the thumbnail module comprises: a rank module adapted to assign a rank to each of the one or more events according to a ranking scheme; and a rank selection module adapted to select, as the representative image, the image corresponding to the event having the highest rank. In some embodiments, the recording represents a videoconference having a plurality of participants. In some embodiments, the image module comprises: a participant selection module adapted to select one of the participants; and an image generation module adapted to generate the representative image based on a portion of the selected section of the video file associated with the selected participant. In some embodiments, the participant selection module comprises at least one of: a participant role module adapted to select the one of the participants based on roles of the participants in the videoconference; and an audio activity module adapted to select the one of the participants based on audio activity levels of the participants.

In general, in one aspect, an embodiment features an apparatus comprising: input means for receiving a recording, wherein the recording includes a video file, and plurality of event records each representing a respective event in the recording, wherein each event record includes a timestamp representing a time of the event in the recording, and an image corresponding to the event; section means for selecting a section of the recording; and thumbnail means for providing a representative image for the selected section of the recording, including timestamp means for determining, based on the timestamps, whether any of the events are associated with the selected section, selection means for selecting the image corresponding to one of the one or more events when one or more events are associated with the selected section, and image means for generating the representative image based on the video file when no events are associated with the selected section.

Embodiments of the apparatus can include one or more of the following features. In some embodiments, the thumbnail means comprises: rank means for assigning a rank to each of the one or more events according to a ranking scheme; and rank selection means for selecting, as the representative image, the image corresponding to the event having the highest rank. In some embodiments, the recording represents a videoconference having a plurality of participants. In some embodiments, the image means comprises: participant selection means for selecting one of the participants; and image generation means for generating the representative image based on a portion of the selected section of the video file associated with the selected participant. In some embodiments, the participant selection means comprises at least one of: participant role means for selecting the one of the participants based on roles of the participants in the videoconference; and audio activity means for selecting the one of the participants based on audio activity levels of the participants.

In general, in one aspect, an embodiment features a method comprising: receiving a recording, wherein the recording includes a video file, and a plurality of event records each representing a respective event in the recording, wherein each event record includes a timestamp representing a time of the event in the recording, and an image corresponding to the event; selecting a section of the recording; and providing a representative image for the selected section of the recording, including determining, based on the timestamps, whether any of the events are associated with the selected section, selecting the image corresponding to one of the one or more events when one or more events are associated with the selected section, and generating the representative image based on the video file when no events are associated with the selected section.

Embodiments of the method can include one or more of the following features. In some embodiments, providing a representative image for the selected section of the recording comprises: assigning a rank to each of the one or more events according to a ranking scheme; and selecting, as the representative image, the image corresponding to the event having the highest rank. In some embodiments, the recording represents a videoconference having a plurality of participants. In some embodiments, generating the representative image based on the video file comprises: selecting one of the participants; and generating the representative image based on a section of the video file contributed by the selected participant. In some embodiments, selecting the one of the participants comprises at least one of: selecting the one of the participants based on roles of the participants in the videoconference; and selecting the one of the participants based on audio activity levels of the participants.

The details of one or more implementations are set forth in the accompanying drawings and the description below. Other features will be apparent from the description and drawings, and from the claims.

DESCRIPTION OF DRAWINGS

FIG. 24 shows a thumbnail index file according to one embodiment.

Figure 1:
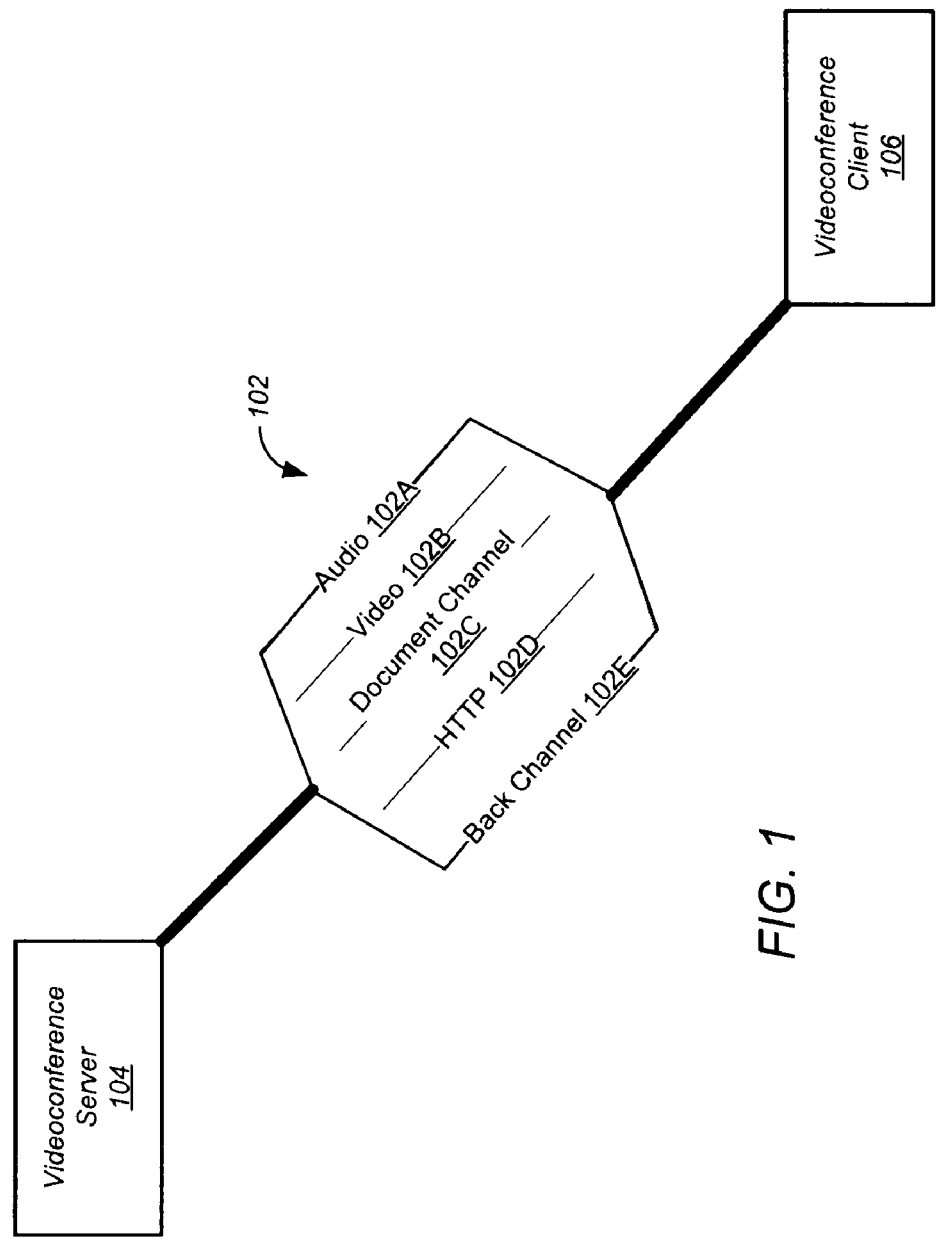
FIG. 1 shows the logical connections between a videoconference client and a videoconference server according to an embodiment of the present invention.

The leading digit(s) of each reference numeral used in this specification indicates the number of the drawing in which the reference numeral first appears.

DETAILED DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices such as special-purpose computers and the like.

The present disclosure relates to generating representative still images from a video recording. For example, the recording can represent a recorded meeting such as a videoconference and the like. The recording includes multiple event records each representing an event. The recording can include multiple media files such as video files, image files, and the like. A user viewing the recording can use the representative still images to quickly identify and access relevant portions of the recording.

In the videoconference example, the media streams can include a video stream for each participant, remote desktop sharing streams, document camera streams, whiteboard streams, document annotation streams, document sharing streams, and the like. The events can include load slide events, remote desktop events, document camera events, whiteboard events, document annotation events, document sharing events, stream change events, chat messages, and the like. Each event has a timestamp that represents a time in the recording.

In some embodiments, the recording is divided into a plurality of sections, and a representative image is generated for each of the sections. To generate an image for one of the sections, the events having a timestamp corresponding to the section are identified, a rank is assigned to each of the identified events according to a ranking scheme, and an image is generated based on the event having the highest rank.

In some embodiments, the recording includes a plurality of media files, and generating an image for an event includes identifying an event type of the event; selecting one of the media files based on the event type; and generating the image according to the content of the selected media file and the time indicated by the timestamp of the event. For example, for a whiteboard event, an image can be generated from the whiteboard media file at the time of the whiteboard event.

Various embodiments are described in terms of recordings of videoconferences. However, other embodiments can be used with any sort of recording that includes a video file and event records representing events in the recording, as will be apparent based on the disclosure and teachings provided herein.

A videoconference client maintains a number of connections to the videoconference server during a videoconference meeting. FIG. 1 shows the logical connections 102 between a videoconference client 106 and a videoconference server 104 according to an embodiment of the present invention. Separate connections 102 are established including an audio connection 102A, a video connection 102B, a document channel connection 102C, an HTTP connection 102D, and a back channel connection 102E. The connection 102 established first is document channel connection 102C, which handles authentication, requests, meeting events and data transfer.

Once document channel connection 102C is established and the user of videoconference client 106 is authenticated to join a videoconference, audio and video connections 102A,B are established. To support video and audio processing on videoconference server 104, back channel connection 102E is also established. Back channel connection 102E communicates video layout changes, other video events, and the like, between videoconference client 106 and videoconference server 104.

Document channel connection 102C is established as needed to support meeting events. Meeting events can include participants events, media events, sideband stream events, annotation events, and the like. Participant events can include events where participants join and leave the videoconference, and the like. Media events can include transferring media files to be shared within the videoconference. The media files can include documents, images, and the like such as word processing files and drawing files. Sideband stream events can include starting and ending sideband streaming sessions for sharing applications, sharing video captured by a document camera, and the like. Annotation events can include participants making annotations of a whiteboard, application image, and the like.

All non-video/audio data streams and files are handled by document channel connection 102C and HTTP connection 102D. For example, when a user adds media, such as a document or image, to the videoconference, a media add command is sent to all videoconference clients over document channel connection 102C. The body of the media add command contains a URL for the media, which is stored on videoconference server 104. In response, each videoconference client 106 establishes an HTTP connection 102D with videoconference server 104 to download the media.

Figure 2:
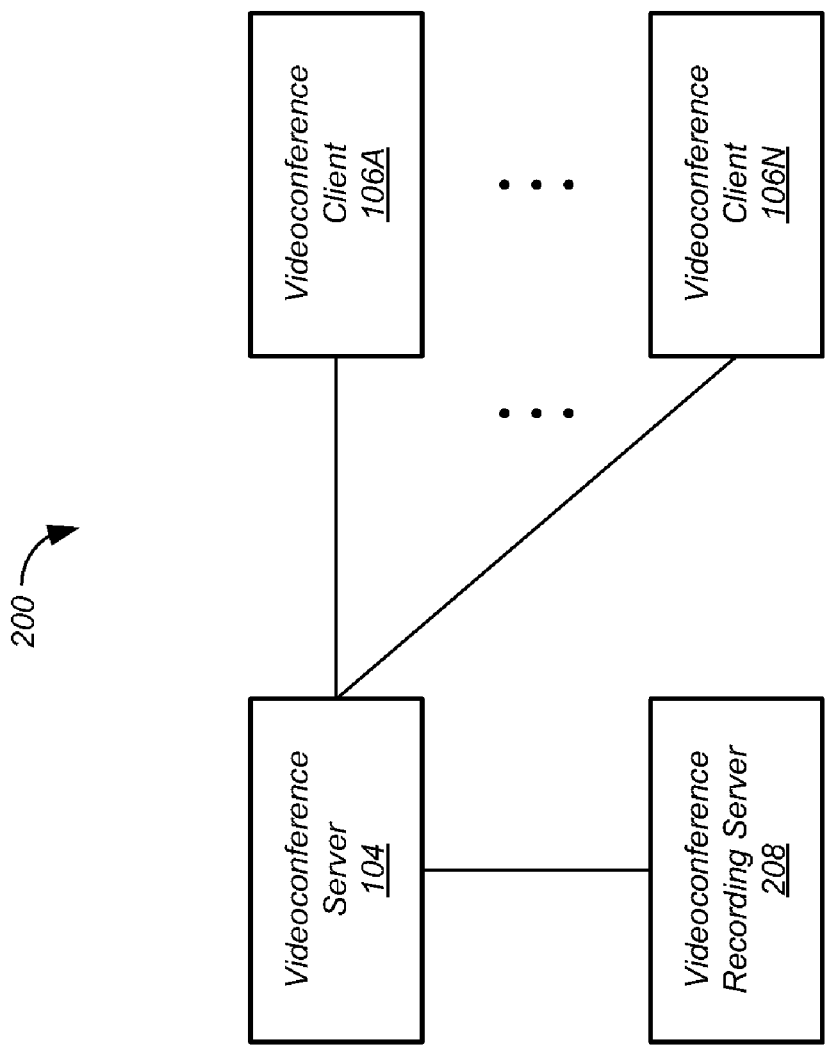
FIG. 2 shows a videoconference recording system according to an embodiment of the present invention.

FIG. 2 shows a videoconference recording system 200 according to an embodiment of the present invention. Videoconference recording system 200 includes one or more videoconference clients 106A-N, a videoconference server 104, and a videoconference recording server 208. To record a videoconference, videoconference recording server 208 connects to videoconference server 104 in the same manner as a videoconference client 106, with the same logical connections 102. To videoconference server 104, videoconference recording server 208 appears the same as a videoconference client 106.

Figure 3:
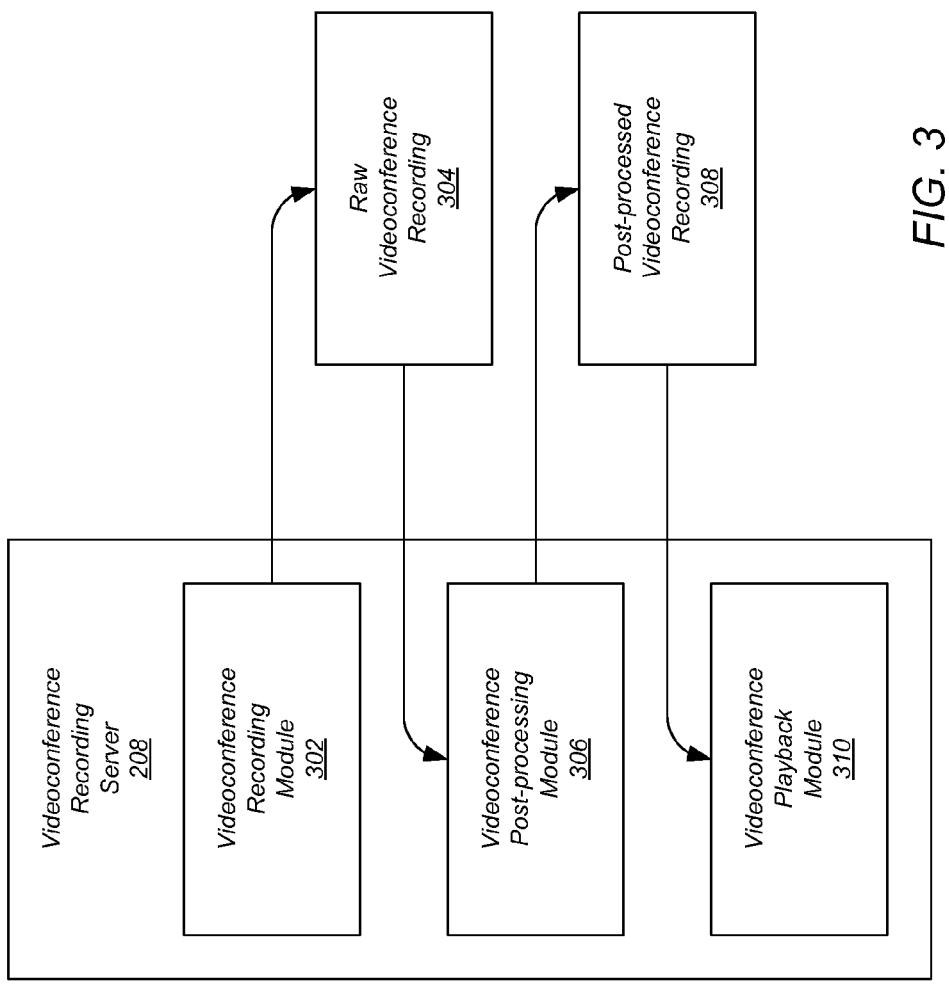
FIG. 3 shows detail of a videoconference recording server according to an embodiment of the present invention.

FIG. 3 shows detail of videoconference recording server 208 according to an embodiment of the present invention. Referring to FIG. 3, videoconference recording server 208 includes a videoconference recording module 302 adapted to generate a raw videoconference recording 304, a videoconference post-processing module 306 adapted to generate a post-processed videoconference recording 308 based on raw videoconference recording 304, and a videoconference playback module 310 to play back a recorded videoconference based on post-processed videoconference recording 308.

Although in the described embodiments, the elements of videoconference recording server 208 are presented in one arrangement, other embodiments may feature other arrangements, as will be apparent to one skilled in the relevant arts based on the disclosure and teachings provided herein. For example, the elements of videoconference recording server 208 can be implemented in hardware, software, or combinations thereof.

Figure 4:
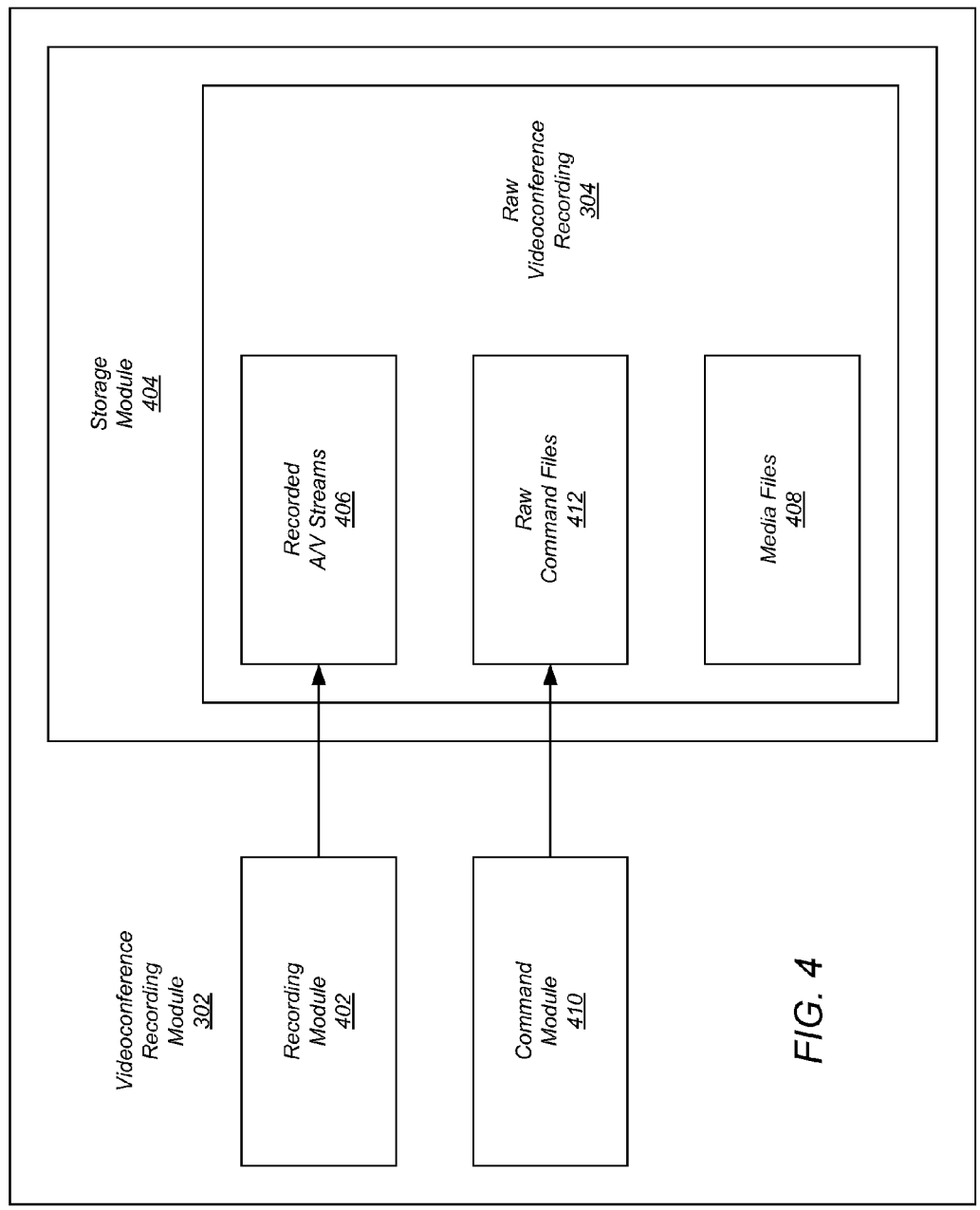
FIG. 4 shows detail of a videoconference recording module according to an embodiment of the present invention.

FIG. 4 shows detail of videoconference recording module 302 of FIG. 3 according to an embodiment of the present invention. Referring to FIG. 4, videoconference recording module 302 includes a recording module 402 adapted to record audio and video streams of videoconferences; a storage module 404 adapted to store the recorded audio and video (A/V) streams 406, media files 408 associated with videoconferences, and the like; and a command module 410 adapted to generate a raw command file 412 for each recorded videoconference. Raw command files 412 are stored on storage module 404. Each raw command file 412 includes records for events that occur during a videoconference. For example, for a media load command, the record includes a time of occurrence in the videoconference of an event associated with the media file, and a reference to the media file. Together the recorded A/V streams 406 for a videoconference, media files 408 associated with the videoconference, and the raw command file 412 for the videoconference comprise a raw videoconference recording 304 of the videoconference.

Figure 5:
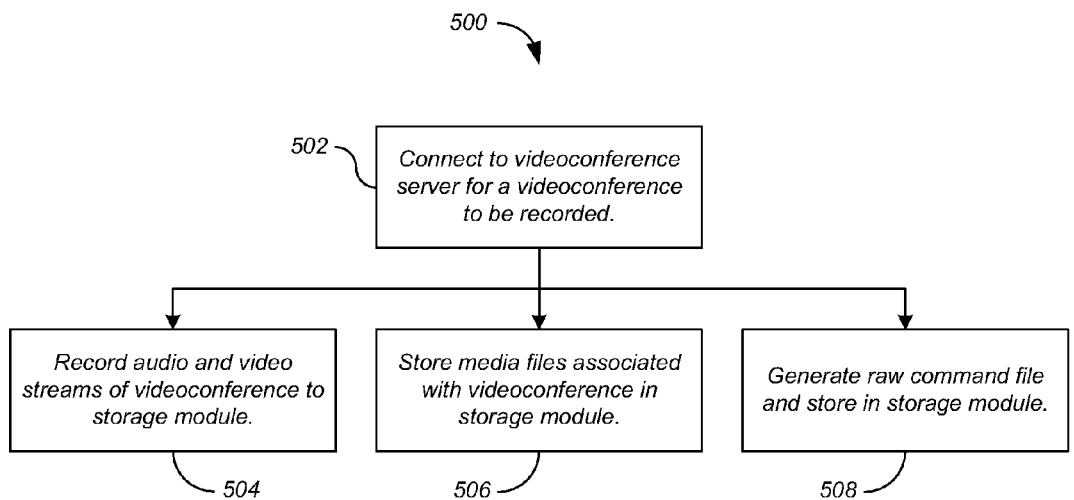
FIG. 5 shows a process for the videoconference recording module of FIG. 4 according to an embodiment of the present invention.

FIG. 5 shows a process 500 for videoconference recording module 302 of FIG. 4 according to an embodiment of the present invention. Although in the described embodiments, the elements of process 500 are presented in one arrangement, other embodiments may feature other arrangements, as will be apparent to one skilled in the relevant arts based on the disclosure and teachings provided herein. For example, in various embodiments, some or all of the steps of process 500 can be executed in a different order, concurrently, and the like.

Referring to FIG. 5, videoconference recording server 208 connects to videoconference server 104 for a videoconference to be recorded (step 502). During the videoconference, videoconference recording server 208 generates a raw videoconference recording 304. In particular, videoconference recording module 302 records the audio and video streams 406 of the videoconference to storage module 404 (step 504).

Videoconference recording server 208 stores media files 408 associated with the videoconference in storage module 404 as well (step 506). Command module 410 generates raw command file 412, which is also stored in storage module 404 (step 508). Command module 410 generates a record in raw command file 412 for each event that occurs during the corresponding videoconference.

Figure 6:
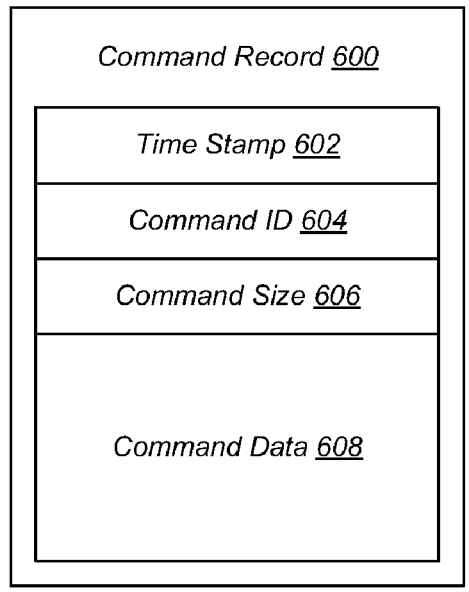
FIG. 6 shows the format of the records in a raw command file according to an embodiment of the present invention.
Figure 6:
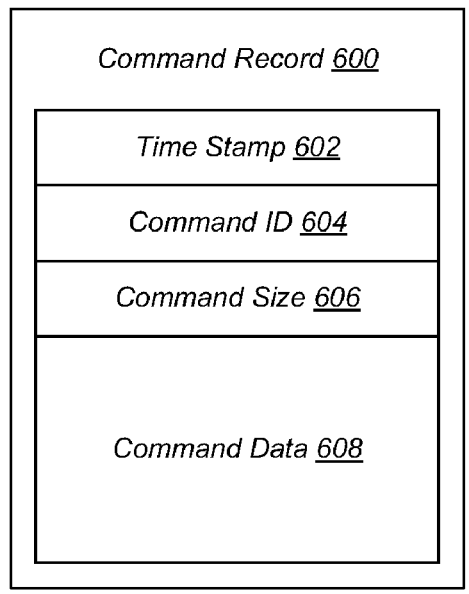

FIG. 6 shows the format of the records 600 in raw command file 412 according to an embodiment of the present invention. Referring to FIG. 6, each record 600 includes a time stamp 602 that indicates a time of occurrence in the videoconference of the respective command. The time of occurrence can represent the time at which the command was generated, transmitted, received, and the like. Each record 600 also includes a command ID 604 that identifies the type of command, a command size 606 that indicates the size of the command, and command data 608 that includes data associated with the command.

If the recorded videoconference were simply to be played back from start to finish, very little post-processing would be required. The events in raw command file 412 could be replayed as they arrived during the original videoconference. But to support the ability to seek to any point in the videoconference, raw videoconference recording 304 is processed to create index files that allow a playback client to seek to any time in the videoconference and to begin viewing the recorded videoconference from that point.

Figure 7:
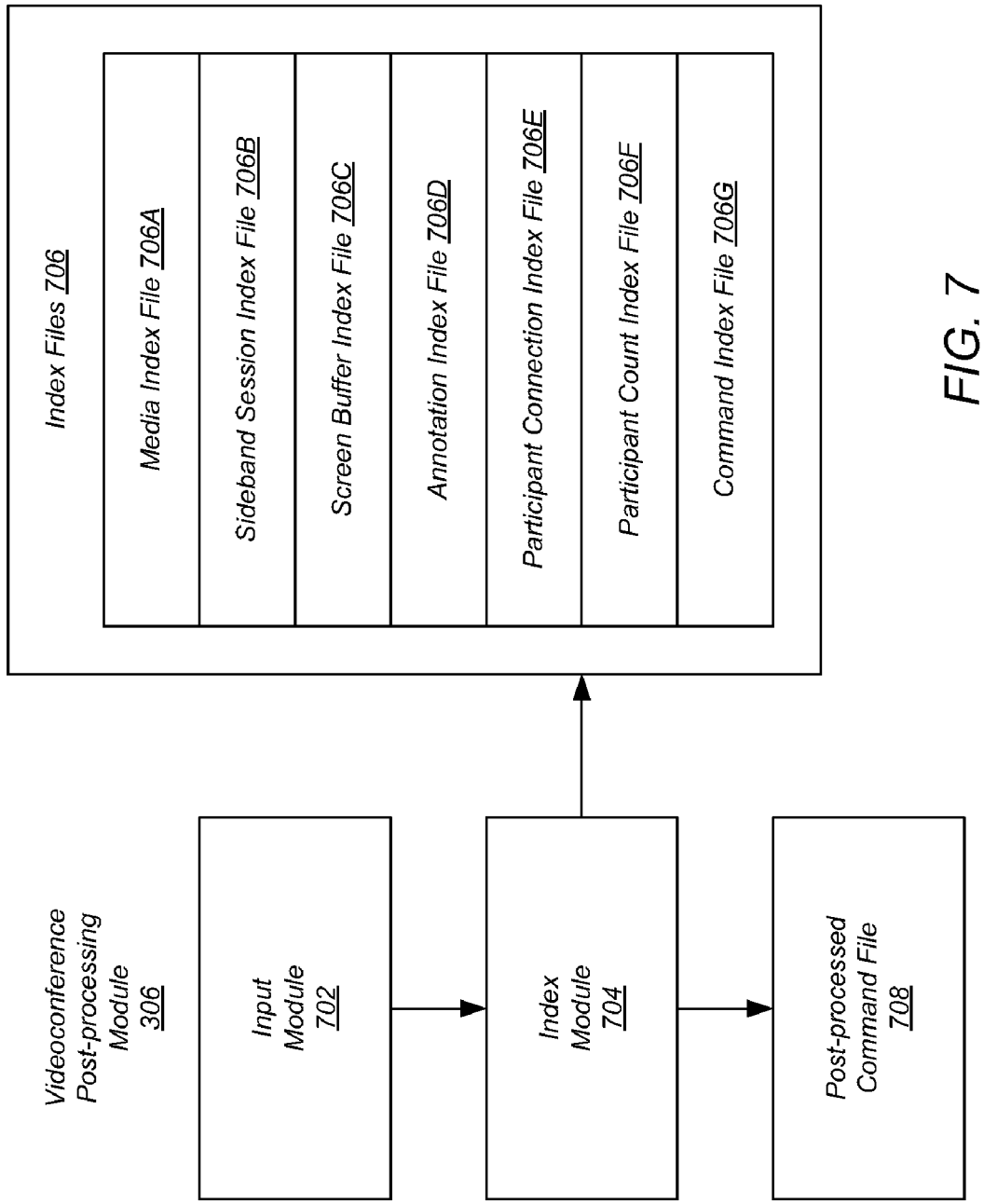
FIG. 7 shows detail of the videoconference post-processing module of FIG. 3 according to an embodiment of the present invention.

FIG. 7 shows detail of videoconference post-processing module 306 of FIG. 3 according to an embodiment of the present invention. Referring to FIG. 7, videoconference post-processing module 306 includes an input module 702 adapted to receive a raw videoconference recording 304 from videoconference recording module 302. Referring again to FIG. 4, raw videoconference recording 304 can include recorded A/V streams 406 for the videoconference, a raw command file 412 for the videoconference, and one or more media files 408 associated with the videoconference.

Referring again to FIG. 7, videoconference post-processing module 306 also includes an index module 704 adapted to generate a post-processed videoconference recording 308 based on each raw videoconference recording 304. Post-processed videoconference recording 308 includes a post-processed command file 708 and one or more index files 706 for each raw videoconference recording 304. Post-processed videoconference recording 308 can include other sorts of files as well, as described below. Index files 706 can include a media index file 706A, a sideband session index file 706B, a screen buffer index file 706C, an annotation index file 706D, a participant connection index file 706E, a participant count index file 706F, and a command index file 706G. Index module 704 processes raw command file 412 in one pass with various handlers called depending on the type of command to be processed. Commands to be used for playback are written to a new post-processed command file 708. Some commands in raw command file 412 are not needed during playback, and so are not included in post-processed command file 708, as described below.

Figure 8:
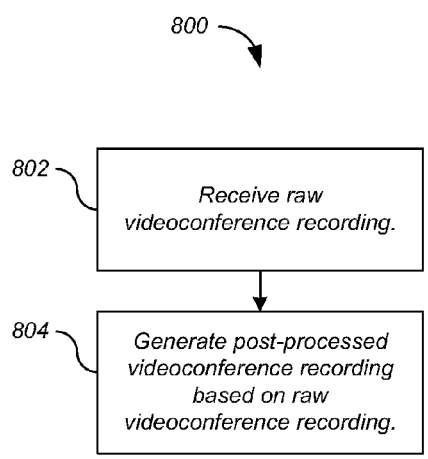
FIG. 8 shows a process for the videoconference post-processing module of FIG. 7 according to an embodiment of the present invention.

FIG. 8 shows a process 800 for videoconference post-processing module 306 of FIG. 7 according to an embodiment of the present invention. Although in the described embodiments, the elements of process 800 are presented in one arrangement, other embodiments may feature other arrangements, as will be apparent to one skilled in the relevant arts based on the disclosure and teachings provided herein. For example, in various embodiments, some or all of the steps of process 800 can be executed in a different order, concurrently, and the like.

Referring to FIG. 8, input module 702 of videoconference post-processing module 306 receives a raw videoconference recording 304 (step 802). Referring again to FIG. 4, raw videoconference recording 304 can include recorded A/V streams 406 for the videoconference, a raw command file 412 for the videoconference, and one or more media files 408 associated with the videoconference.

Referring again to FIG. 8, index module 704 generates a post-processed videoconference recording 308 based on raw videoconference recording 304 (step 804). As described above, post-processed videoconference recording 308 includes a post-processed command file 708 and one or more index files 706, and can include other sorts of files as well.

In some embodiments, videoconference recording system 200 allows videoconference clients 106 to share information using sideband streaming sessions. For example, a sideband streaming session can be used to share applications, to share paper documents using a document camera, and the like. Post-processing of an application sharing session is now described. However, this description is applicable to other sorts of sideband streaming sessions.

In an application sharing session, screen updates are sent over time as areas on the screen change. That is, a videoconference client 106 sharing an application sends screen updates as they occur. Videoconference server 104 then sends these region updates on to other connected videoconference clients 106. Depending on the size of the update region, the updates can be sent in a chain with designations for first, middle or last blocks. At other times only a single block is sent with a corresponding designation. Cursor move messages are also transmitted so other videoconference clients 106 can update the position of the cursor in the screen.

Videoconference server 104 maintains a screen buffer for each application sharing session, and updates the screen buffer as the screen updates are received. When a new videoconference client 106 joins a videoconference during an application sharing session, videoconference server 104 sends the latest screen buffer to the new videoconference client 106 followed by the ensuing screen updates. Without the screen buffer, videoconference server 104 would have to send all of the previous screen updates to the new videoconference client 106.

Videoconference recording server 208 handles sideband sharing sessions in a similar manner. However, instead of creating screen buffers during recording of the videoconference, videoconference recording server 208 creates screen buffers during the post-processing phase. During post-processing, videoconference post-processing module 306 scans raw command file 412 for sideband session commands. These sideband session commands generally include session start commands, session end commands, screen data commands, cursor move commands, and the like. Based on these sideband session commands, index module 704 creates a sideband session index file.

Figure 9:
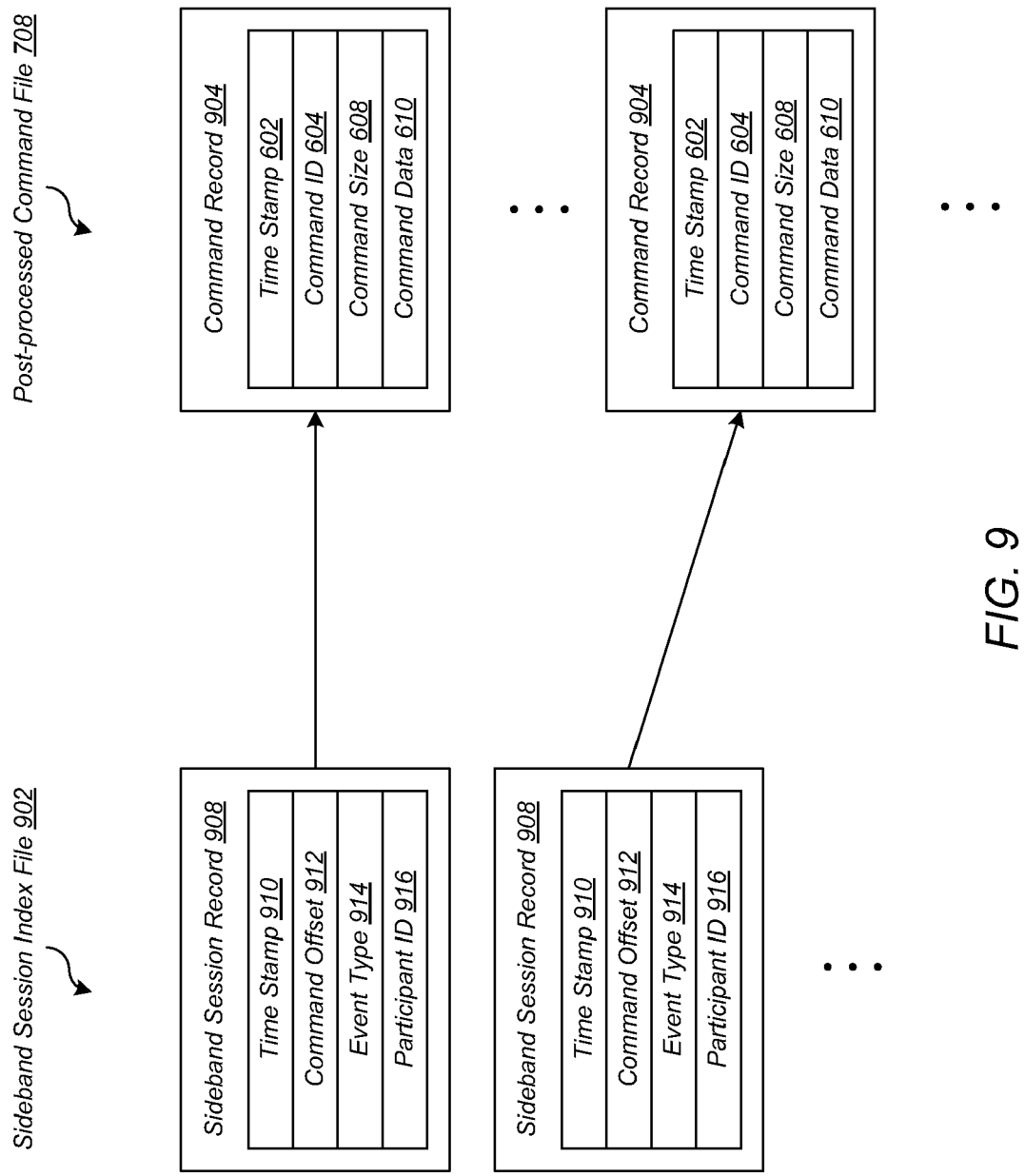
FIG. 9 shows portions of a sideband session index file and a post-processed command file for a recorded videoconference according to an embodiment of the present invention.

FIG. 9 shows portions of a sideband session index file 902 and a post-processed command file 708 for a recorded videoconference according to an embodiment of the present invention. Post-processed command file 708 includes a plurality of command records 904, which can have the same format as records 600 in raw command file 412. Sideband session index file 902 includes a sideband session record 908 for each sideband session command in post-processed command file 708, as well as a reference to the sideband session command in the form of a pointer or the like. Each sideband session record 908 includes a time stamp 910 indicating a time of occurrence of the command, a command offset 912 indicating an offset of the command into post-processed command file 708, an event type 914 indicating the type of event indicated by the command, and a participant ID 916 indicating the participant responsible for the command.

Command records 904 are arranged in chronological order in post-processed command file 708. Sideband session records 908 are also arranged in chronological order in sideband session index file 902, which allows videoconference playback module 310 (FIG. 3) to quickly determine if an application sharing session is in progress during a requested seek time.

Index module 704 also generates application sharing screen buffers so that a client seeking to a point in the recorded videoconference does not require all of the screen updates from the start of the videoconference. The screen buffers are generated frequently enough such that after a screen update is sent to a videoconference client 106, only a small number of subsequent screen updates are required to bring the playback up to the desired seek time. Index module 704 also generates a screen buffer index file to point to the screen buffers, and to corresponding commands in post-processed command file 708.

Figure 10:
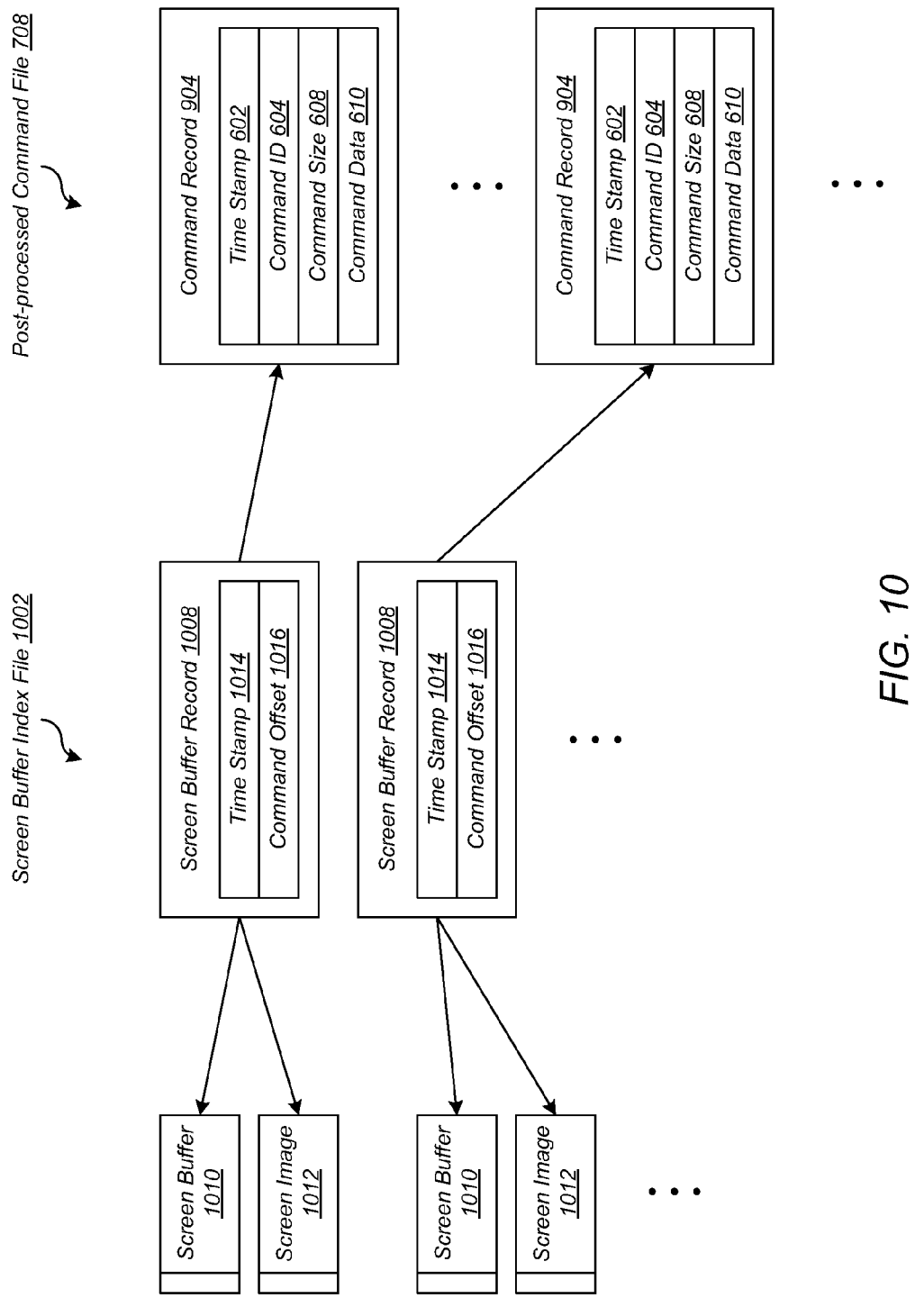
FIG. 10 shows portions of a screen buffer index file and a post-processed command file for a recorded videoconference according to an embodiment of the present invention.

FIG. 10 shows portions of a screen buffer index file 1002 and a post-processed command file 708 for a recorded videoconference according to an embodiment of the present invention. Post-processed command file 708 includes a plurality of command records 904, which can have the same format as records 600 in raw command file 412. Screen buffer index file 1002 includes a screen buffer record 1008 for each screen buffer 1010 and its associated screen image 1012. Each screen buffer 1010 contains both command and image data for updating the sideband session screen region on videoconference clients 106. Each screen image 1012 contains image data of the full screen region.

Each screen buffer record 1008 includes a time stamp 1014 and a command offset 1016 indicating an offset of the command into post-processed command file 708, and has pointers to the associated screen buffer 1010, screen image 1012, and command record 904 in post-processed command file 708. Screen buffer records 1008 are arranged in chronological order in screen buffer index file 1002 to facilitate seek operations, as described below.

Videoconference client 106 can provide tools for the user to annotate images such as whiteboards, slides, and the like. Annotations can include text, lines, objects, and the like with attributes such as color, size, transparency, and the like. When a user creates an annotation, videoconference client 106 sends a command on document channel connection 102C to videoconference server 104, which distributes the command to all the connected videoconference clients 106. Included in the command is a media ID that designates the media item to which the annotation belongs. Each videoconference client 106 then updates the designated media item with the latest annotation. During the recording process, videoconference recording module 302 saves all annotation-related commands to raw command file 412.

Figure 11:
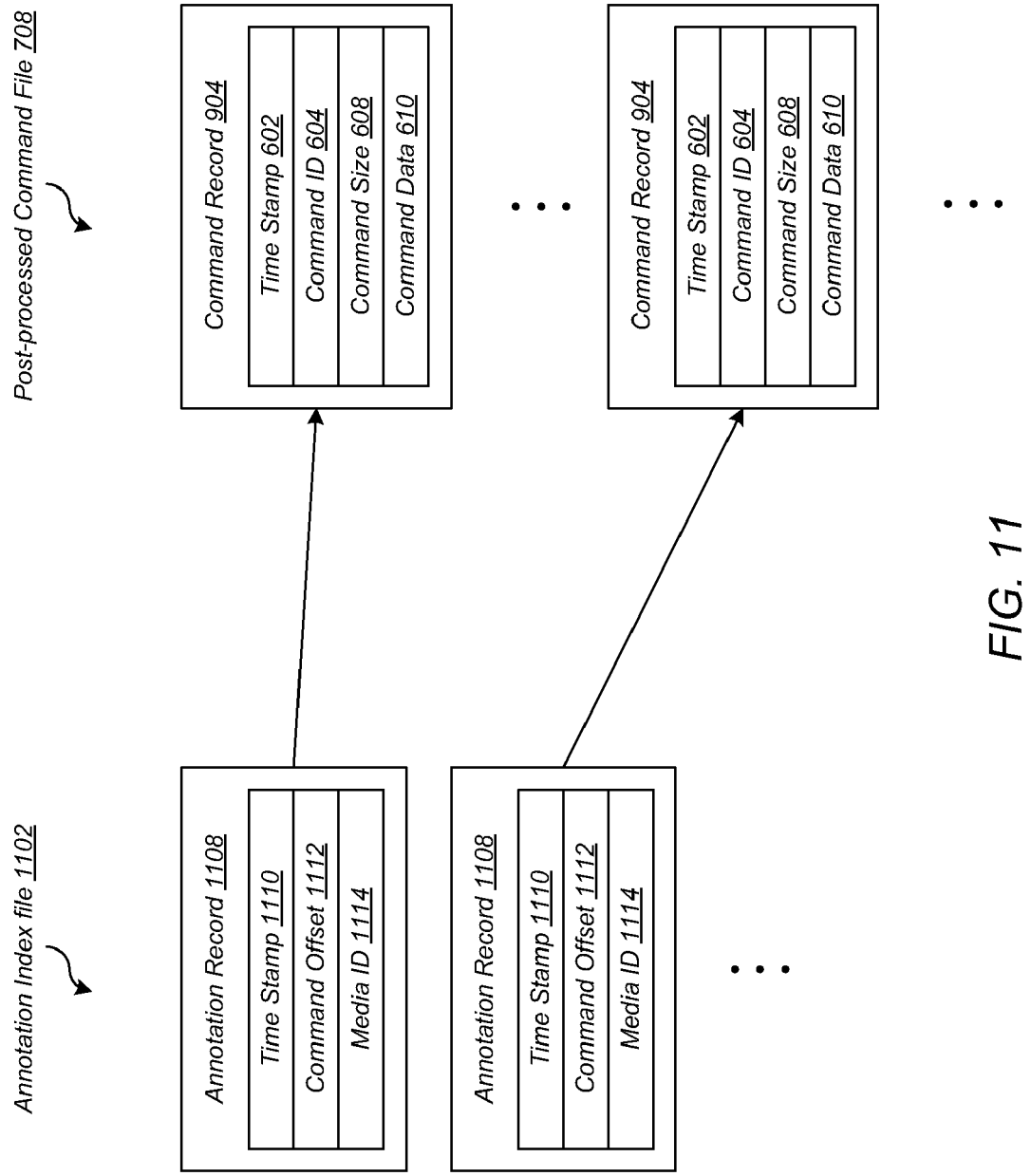
FIG. 11 shows portions of an annotation index file and a post-processed command file for a recorded videoconference according to an embodiment of the present invention.

In the post-processing phase, videoconference post-processing module 306 creates an annotation index file. FIG. 11 shows portions of an annotation index file 1102 and a post-processed command file 708 for a recorded videoconference according to an embodiment of the present invention. Post-processed command file 708 includes a plurality of command records 904, which can have the same format as records 600 in raw command file 412. Annotation index file 1102 includes an annotation record 1108 for each annotation command in post-processed command file 708, as well as a reference to the corresponding annotation command in post-processed command file 708 in the form of a pointer or the like. Each annotation record 1108 includes a time stamp 1110 indicating a time of occurrence of the command, a command offset 1112 indicating an offset of the command into post-processed command file 708, and a media ID 1114 indicating the media associated with the annotation command. Annotation records 1108 are arranged in chronological order in annotation index file 1102 to facilitate seek operations, as described below.

Because annotation commands contain much less data than application sharing commands, a screen buffer is not required. During a seek operation, videoconference recording server 208 re-sends previous annotation commands up to the desired seek time for all media active in the meeting at the seek time. Videoconference recording server 208 can send all previous annotation commands following the start of the recording, following a previous delete annotation command, and the like. Annotation index file 1102 can be used to quickly identify annotation commands for each media item to avoid reading the entirety of post-processed command file 708.

During the course of a videoconference, users can add new media such as whiteboard, images, documents, slides, and the like. When a media item is added to the videoconference, videoconference server 104 sends a media change command to all the videoconference clients 106. For items such as images and documents, the videoconference clients 106 use the HTTP protocol to download the media items from videoconference server 104.

Videoconference post-processing module 306 creates a media index file, as described below, that enables videoconference playback module 310 to quickly determine which media items are active at a given seek time in the videoconference. These new media commands are not copied from raw command file 412 to post-processed command file 708. Instead, when a videoconference client 106 connects to videoconference recording server 208 to play back a videoconference, videoconference recording server 208 sends a command to that videoconference client 106 that contains a list of all the media used during the course of the videoconference. In response, videoconference client 106 begins downloading the media items to prepare for their use during playback.

Figure 12:
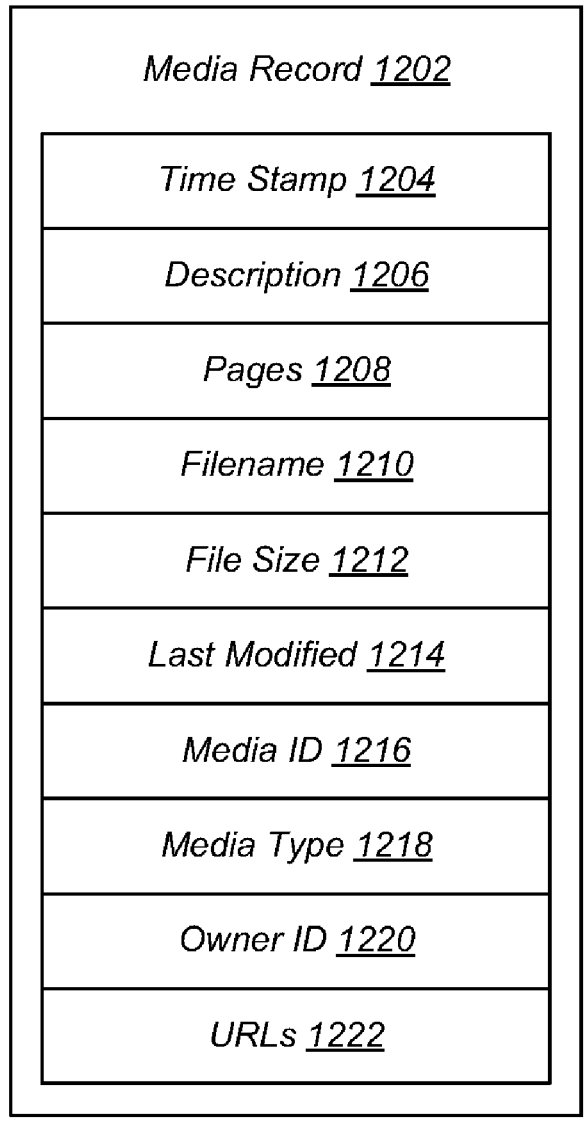
FIG. 12 shows the format of a media item list sent by a videoconference recording server to a videoconference client according to an embodiment of the present invention.

FIG. 12 shows the format of a media item list 1200 sent by a videoconference recording server 208 to a videoconference client 106 according to an embodiment of the present invention. Media item list 1200 includes a media record 1202 for each media item used in the videoconference. Each media record 1202 includes a time stamp 1204 indicating a time of occurrence of the media item in the videoconference, a description 1206 of the media item, a pages identifier 1208 indicating one or more pages displayed in the media item during the videoconference, indicators of the filename 1210, file size 1212, and time last modified 1214, the media ID 1216, media type 1218, owner ID 1220 indicating an owner of the media item, and one or more URLs 1222 where the media item can be obtained.

During the course of a videoconference, a media item may be displayed and re-displayed a number of times. When a user clicks to display a media item, the user's videoconference client 106 sends a command to videoconference server 104, which then distributes the command to all the connected videoconference clients 106. On receiving the command, a videoconference client 106 displays the media item identified by the media ID and page number in the received command. In order to reproduce this flow of displayed media items in the recorded videoconference, videoconference post-processing module 306 creates an index file is created that identifies the display media events.

Figure 13:
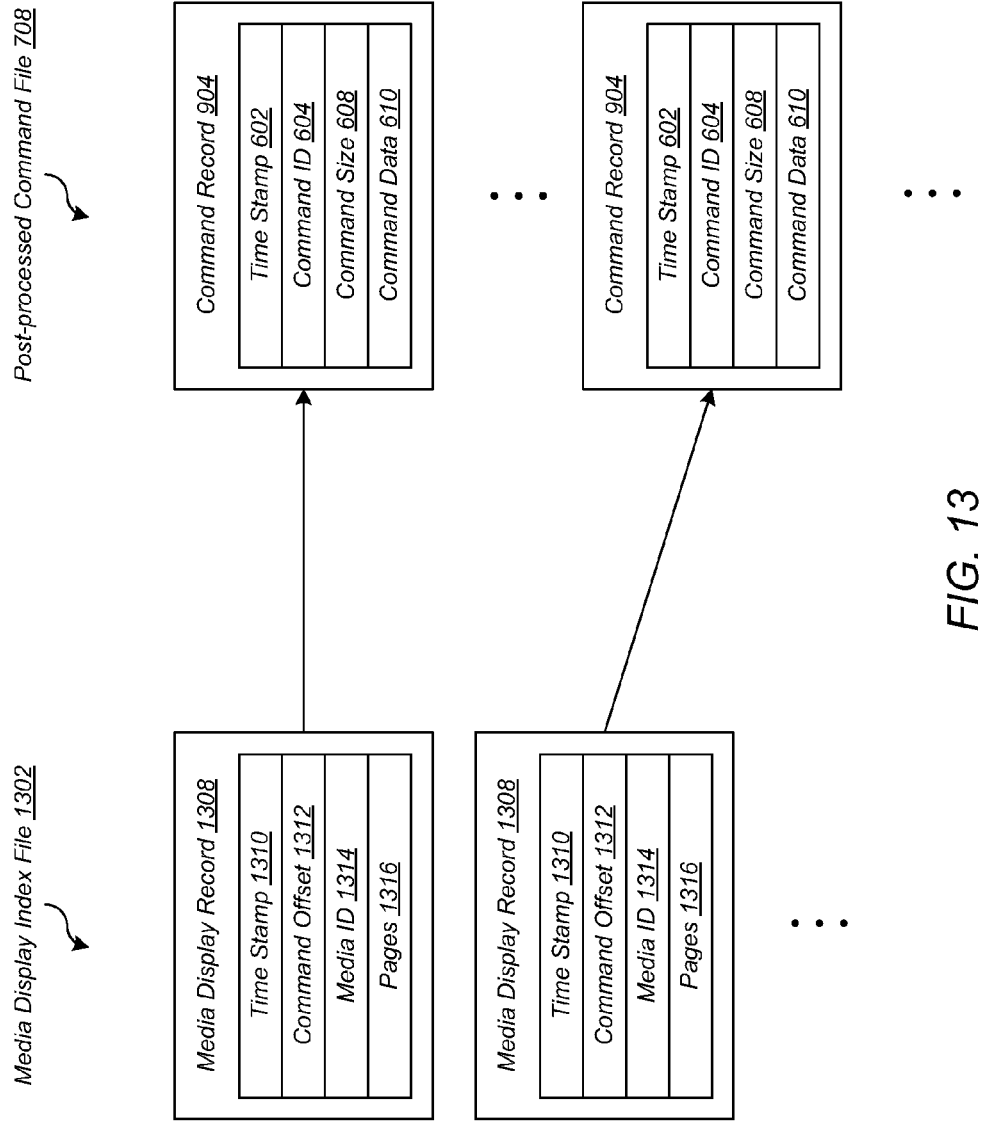
FIG. 13 shows portions of a media display index file and a post-processed command file for a recorded videoconference according to an embodiment of the present invention.

FIG. 13 shows portions of a media display index file 1302 and a post-processed command file 708 for a recorded videoconference according to an embodiment of the present invention. Post-processed command file 708 includes a plurality of command records 904, which can have the same format as records 600 in raw command file 412. Media display index file 1302 includes a media display record 1308 for each media command in post-processed command file 708, as well as a reference to the media command in post-processed command file 708 in the form of a pointer or the like. Each media display record 1308 includes a time stamp 1310 indicating a time of occurrence of the command, a command offset 1312 indicating an offset of the command into post-processed command file 708, a media ID 1314 indicating the media associated with the media display command, and a pages identifier 1316 indicating one or more pages displayed in the media item during the videoconference. Media display records 1308 are arranged in chronological order in media display index file 1302 to facilitate seek operations, as described below.

When a videoconference is scheduled, the videoconference administrator will designate which users can participate. During the course of the videoconference, participants can be added and removed. When a videoconference client 106 connects to videoconference server 104, videoconference server 104 sends a command to videoconference client 106 containing a list of the invited participants for that videoconference. If the list of invited participants changes during the course of the videoconference, videoconference server 104 sends a command to videoconference clients 106 updating the list of invited participants.

During the course of a videoconference, participants can join and leave the videoconference. Each of these events causes videoconference server 104 to send another command to the connected videoconference clients 106 to update the connection status of the participant associated with the event.

During the post-processing phase, videoconference post-processing module 306 creates a participant data file to identify all invited participants by parsing raw command file 412 to extract all the commands that update the list of participants invited to the meeting. These commands are not copied to post-processed command file 708, but instead are recreated from the participant data file when a videoconference client 106 connects to videoconference recording server 208 to play back the videoconference. Videoconference post-processing module 306 also creates a list of connect/disconnect events for each participant.

Figure 14:
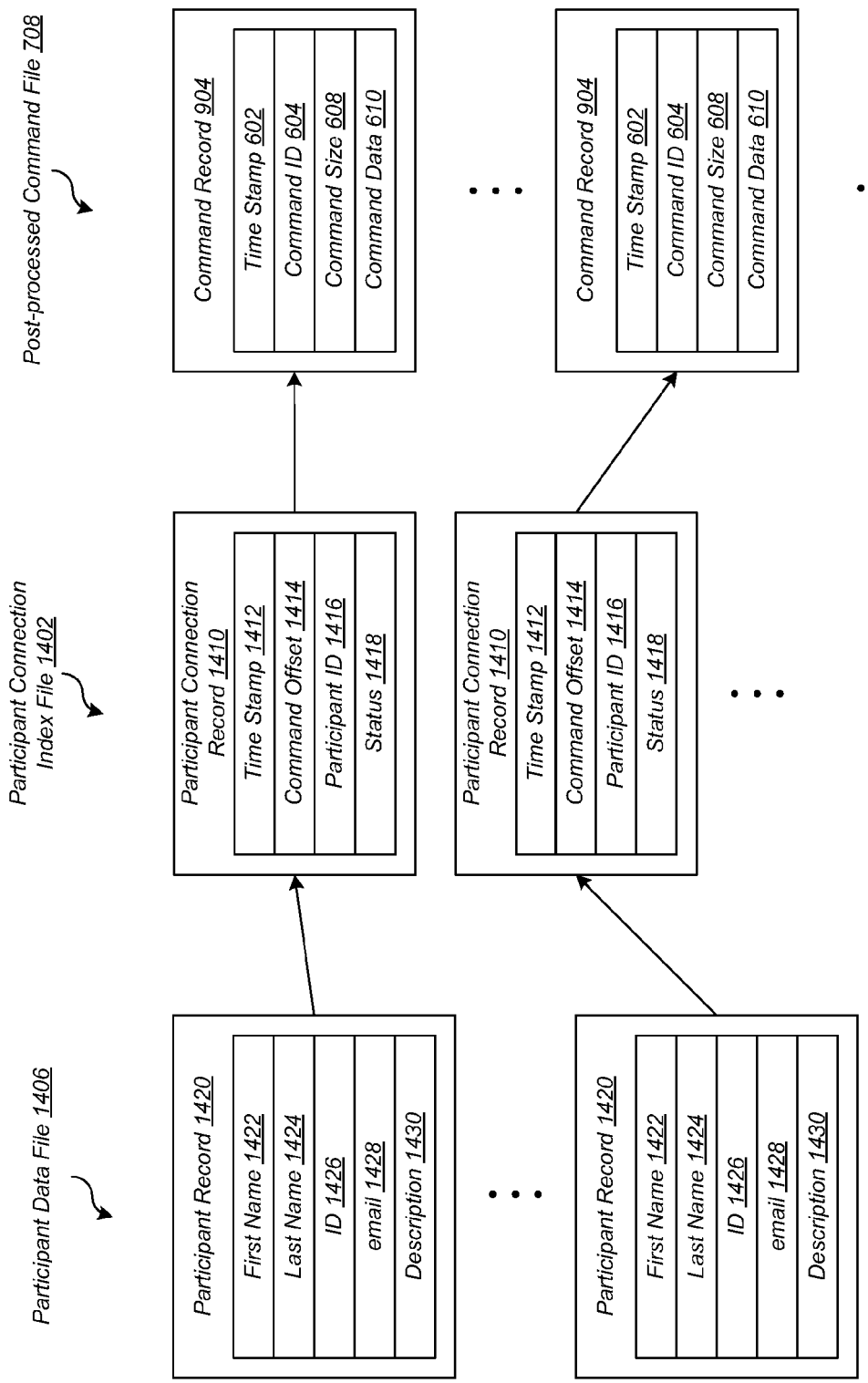
FIG. 14 shows portions of a participant connection index file, a post-processed command file, and a participant data file for a recorded videoconference according to an embodiment of the present invention.

FIG. 14 shows portions of a participant connection index file 1402, a post-processed command file 708, and a participant data file 1406 for a recorded videoconference according to an embodiment of the present invention. Post-processed command file 708 includes a plurality of command records 904, which can have the same format as records 600 in raw command file 412. Participant connection index file 1402 includes a participant connection record 1410 for each participant connection command in post-processed command file 708, as well as a reference to the media command in the form of a pointer or the like. Each participant connection record 1410 includes a time stamp 1412 indicating a time of occurrence of the command, a command offset 1414 indicating an offset of the command into post-processed command file 708, a participant ID 1416 identifying the participant associated with the participant connection command, and a status identifier 1418 indicating a connection status of the participant.

Participant data file 1406 includes a participant record 1420 for each participant invited to the videoconference. Each participant record 1420 includes, for the participant, first and last names 1422, 1424, a participant ID 1426, an email address 1428, and a description 1430. Each participant record 1420 also includes references to one or more participant connection records 1410. Each reference can take the form of a pointer or the like.

Figure 15:
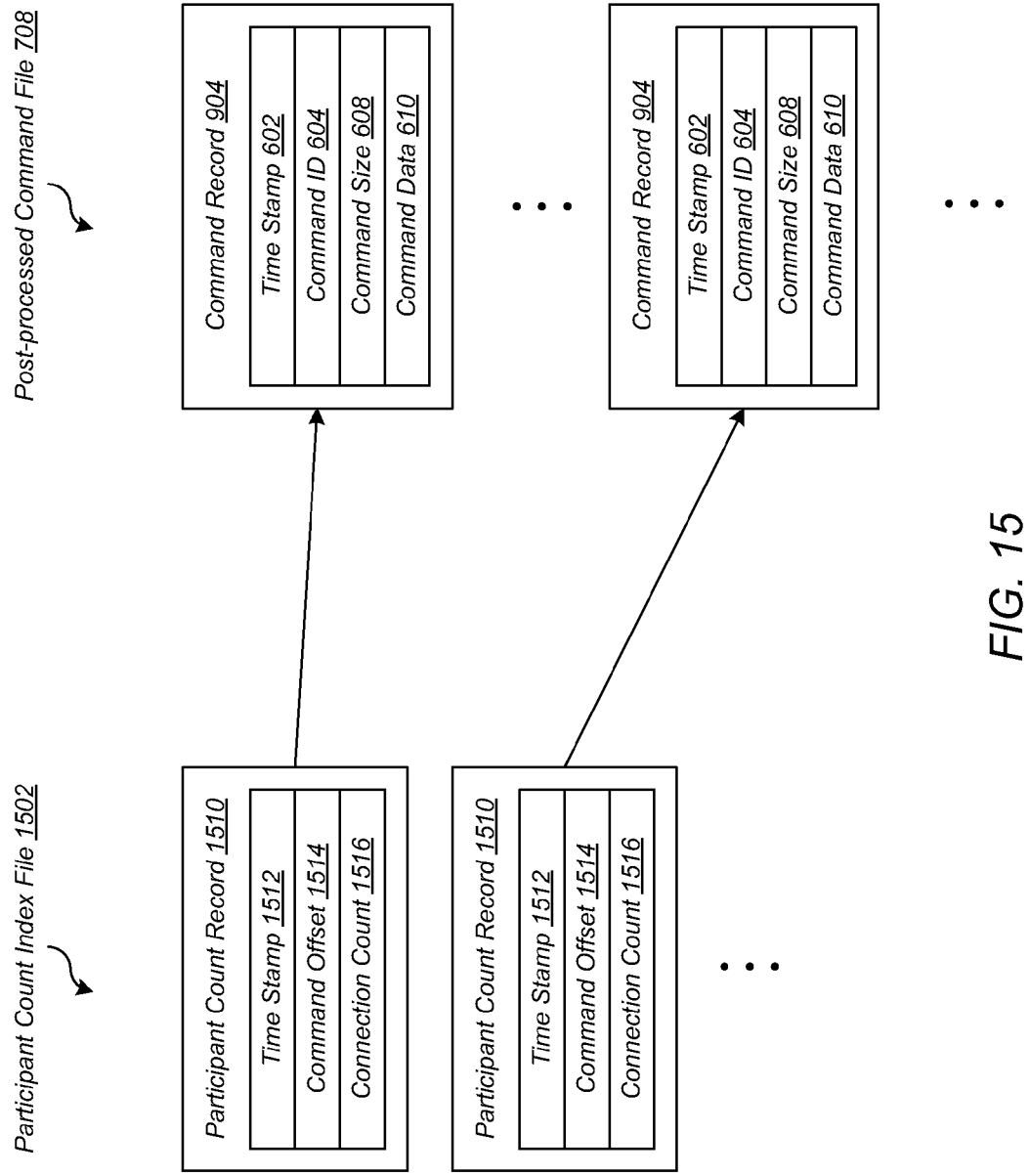
FIG. 15 shows portions of a participant count index file and a post-processed command file for a recorded videoconference according to an embodiment of the present invention.

Videoconference post-processing module 306 also creates a participant count index file. FIG. 15 shows portions of a participant count index file 1502 and a post-processed command file 708 for a recorded videoconference according to an embodiment of the present invention. Post-processed command file 708 includes a plurality of command records 904, which can have the same format as records 600 in raw command file 412. Participant count index file 1502 includes a participant count record 1510 for each participant connection command in post-processed command file 708, as well as a reference to the command in the form of a pointer or the like. Each participant count record 1510 includes a time stamp 1512 indicating a time of occurrence of the command, a command offset 1514 indicating an offset of the command into post-processed command file 708, and a connection count 1516 indicating the number of connected participants following execution of the command. Participant count index file 1502 allows the number of connected participants at a given seek time to be determined quickly. Participant count records 1510 are arranged in chronological order in participant count index file 1502 to facilitate seek operations, as described below.

Videoconference post-processing module 306 also creates a command index file including records that point to the time and file offset of commands in post-processed command file 708. The command index file allows videoconference playback module 310 to quickly identify the closest command when seeking to a new seek time during playback.

Figure 16:
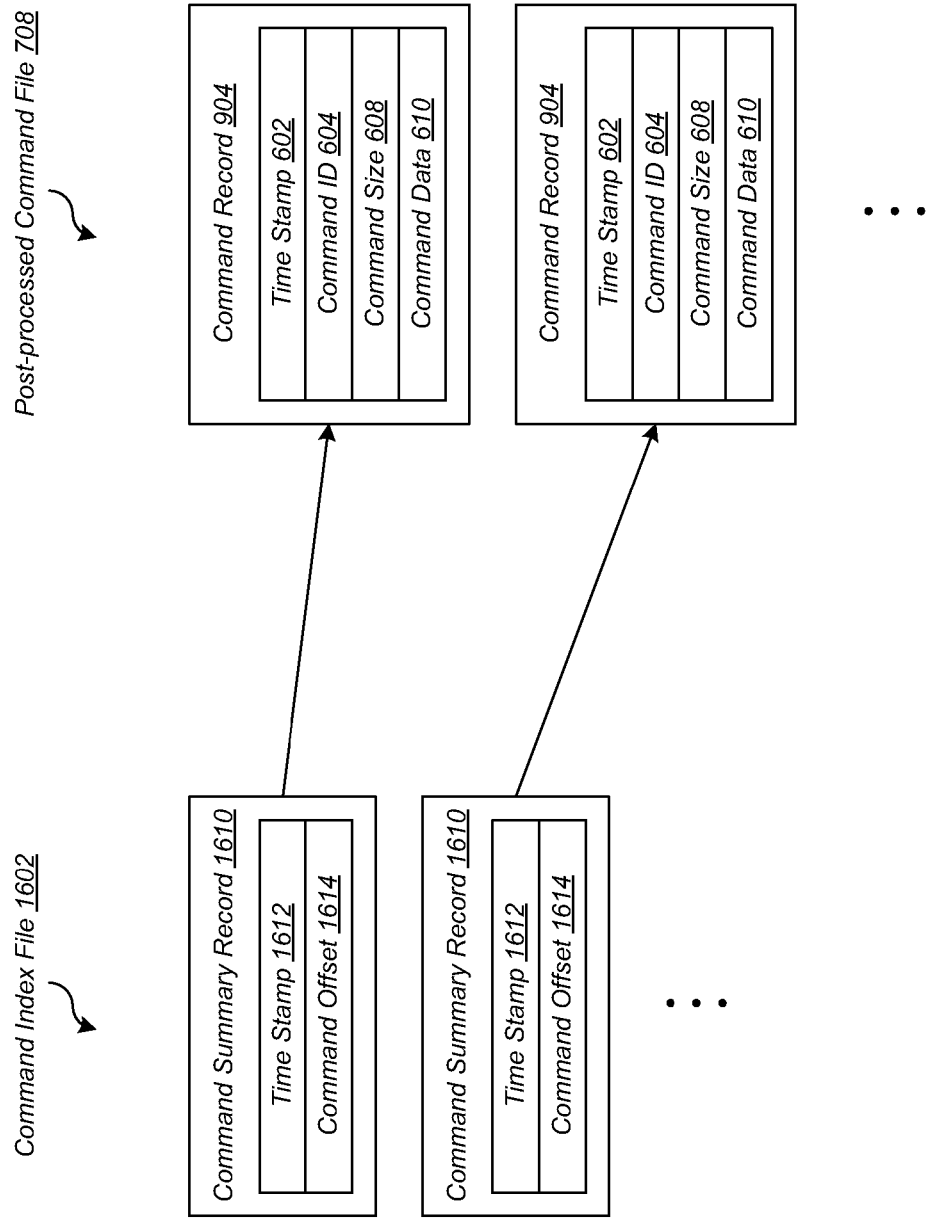
FIG. 16 shows portions of a command index file and a post-processed command file for a recorded videoconference according to an embodiment of the present invention.

FIG. 16 shows portions of a command index file 1602 and a post-processed command file 708 for a recorded videoconference according to an embodiment of the present invention. Post-processed command file 708 includes a plurality of command records, which can have the same format as records 600 in raw command file 412. Command index file 1602 includes a command summary record 1610 for each command in post-processed command file 708, as well as a reference to the command in post-processed command file 708 in the form of a pointer or the like. Each command summary record 1610 includes a time stamp 1612 indicating a time of occurrence of the command and a command offset 1614 indicating an offset of the command into post-processed command file 708. Command summary records 1610 are arranged in chronological order in command index file 1602 to facilitate seek operations, as described below.

Figure 17:
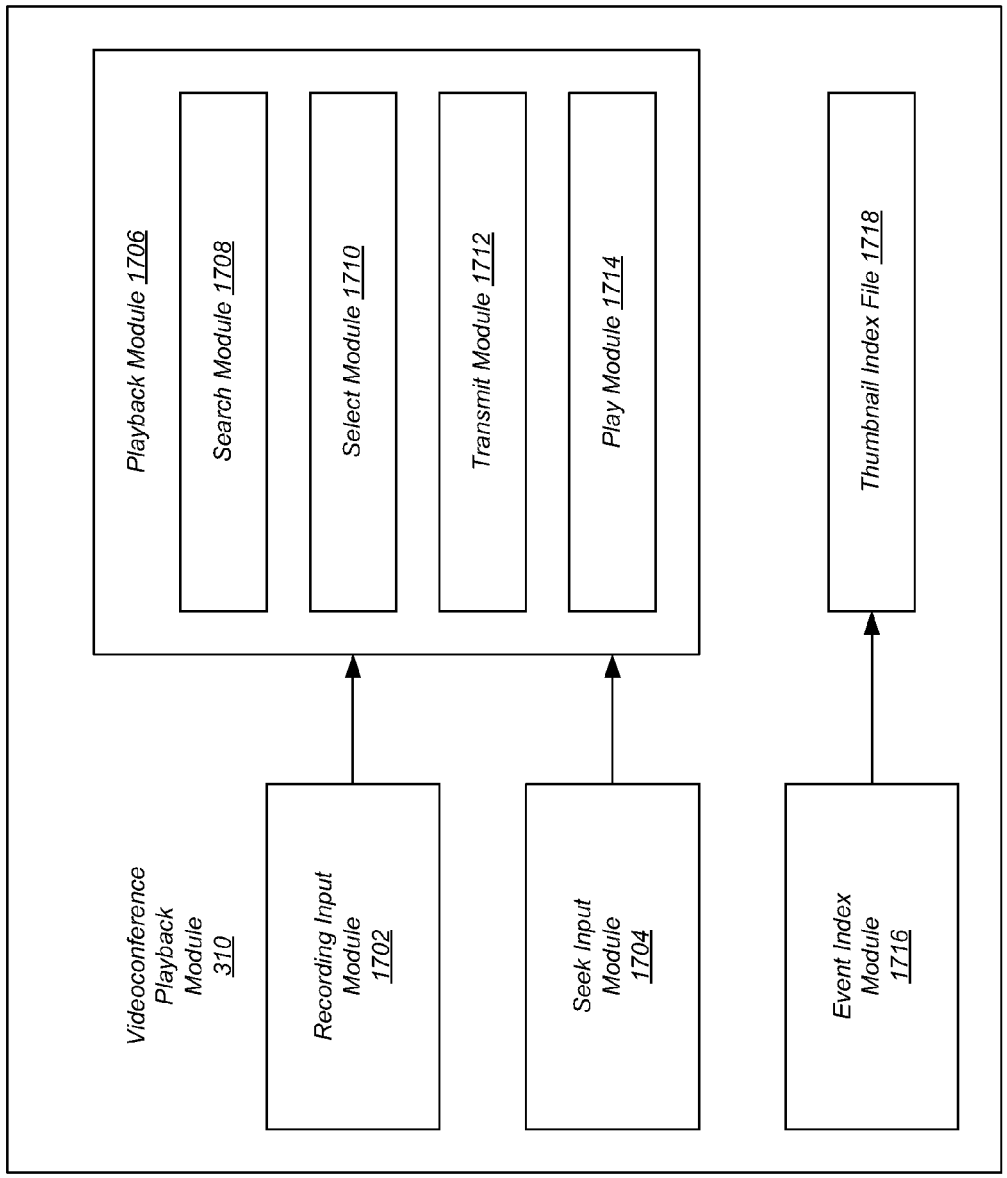
FIG. 17 shows detail of a videoconference playback module according to an embodiment of the present invention.

After post-processing, a videoconference is ready for playback. Referring again to FIG. 3, videoconference playback is handled by videoconference playback module 310 of videoconference recording server 208. FIG. 17 shows detail of videoconference playback module 310 according to an embodiment of the present invention. Referring to FIG. 17, videoconference playback module 310 includes a recording input module 1702 adapted to receive a post-processed videoconference recording 308, a seek input module 1704 adapted to receive a seek time for beginning playback of post-processed videoconference recording 308, and a playback module 1706 adapted to play back the videoconference. Playback module 1706 includes a search module 1708, a select module 1710, a transmit module 1712, a play module 1714, and an event index module 1716.

Figure 18A:
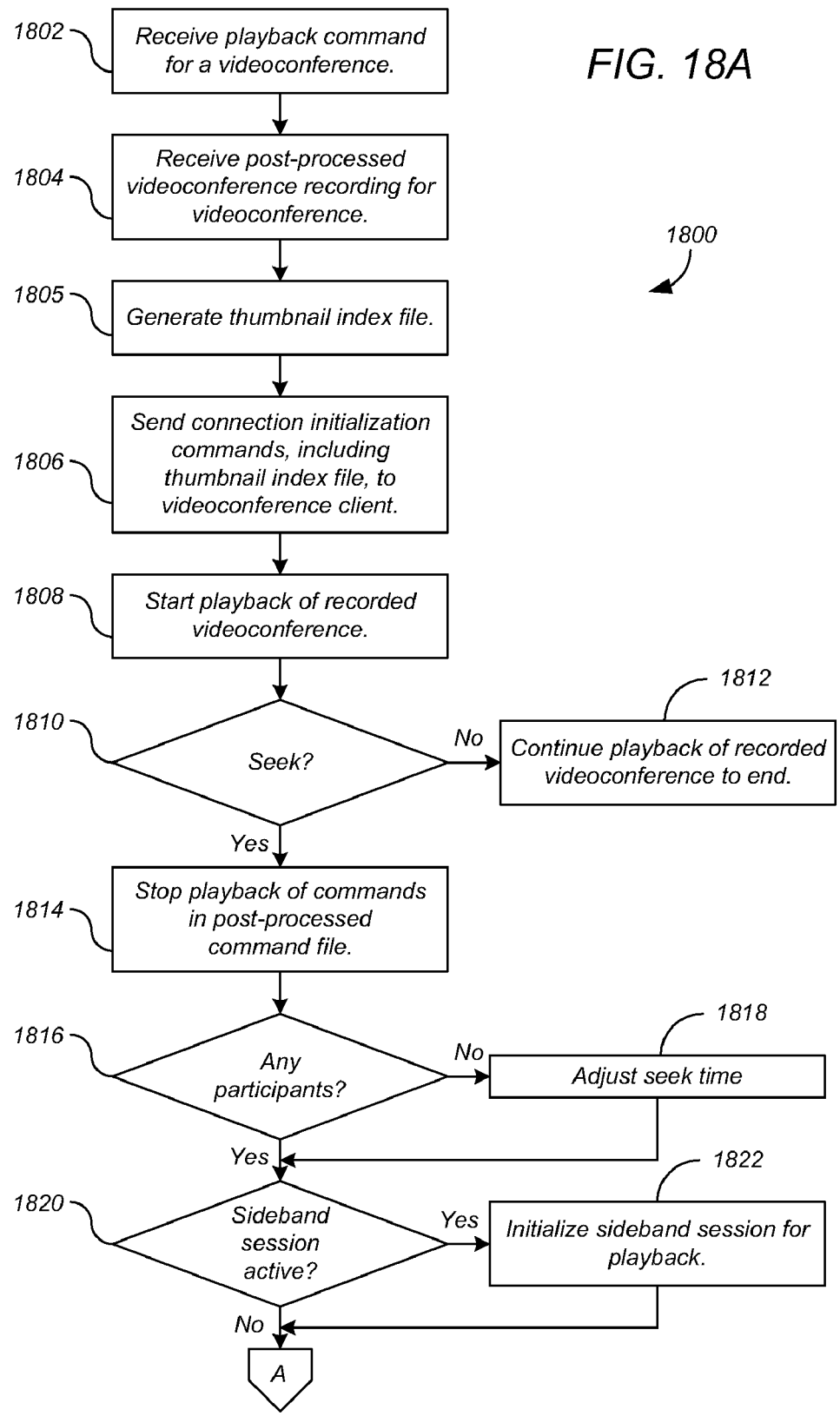
FIG. 18 shows a process for the videoconference playback module of FIG. 17 according to an embodiment of the present invention.
Figure 18B:
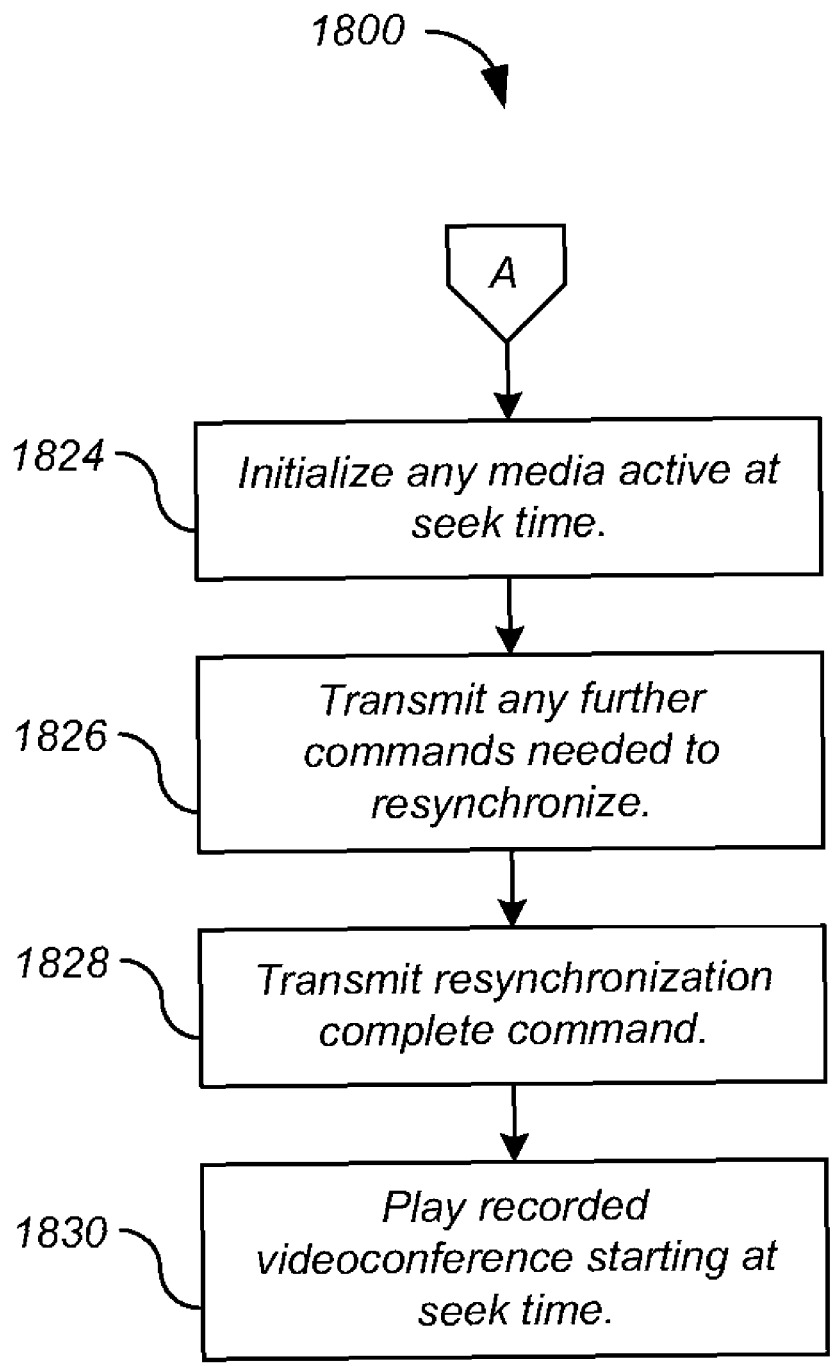

FIG. 18 shows a process 1800 for videoconference playback module 310 of FIG. 17 according to an embodiment of the present invention. Although in the described embodiments, the elements of process 1800 are presented in one arrangement, other embodiments may feature other arrangements, as will be apparent to one skilled in the relevant arts based on the disclosure and teachings provided herein. For example, in various embodiments, some or all of the steps of process 1800 can be executed in a different order, concurrently, and the like.

Referring to FIG. 18, a videoconference client 106 initiates playback of a recorded videoconference by sending a playback command that identifies the videoconference. Videoconference playback module 310 receives the playback command (step 1802). In response, recording input module 1702 of videoconference playback module 310 receives the post-processed videoconference recording 308 for the videoconference (step 1804). Post-processed videoconference recording 308 can include recorded A/V streams 406 for the videoconference, a post-processed command file 708 for the videoconference, one or more index files 706, and one or more media files 408 associated with the videoconference.

Figure 20:
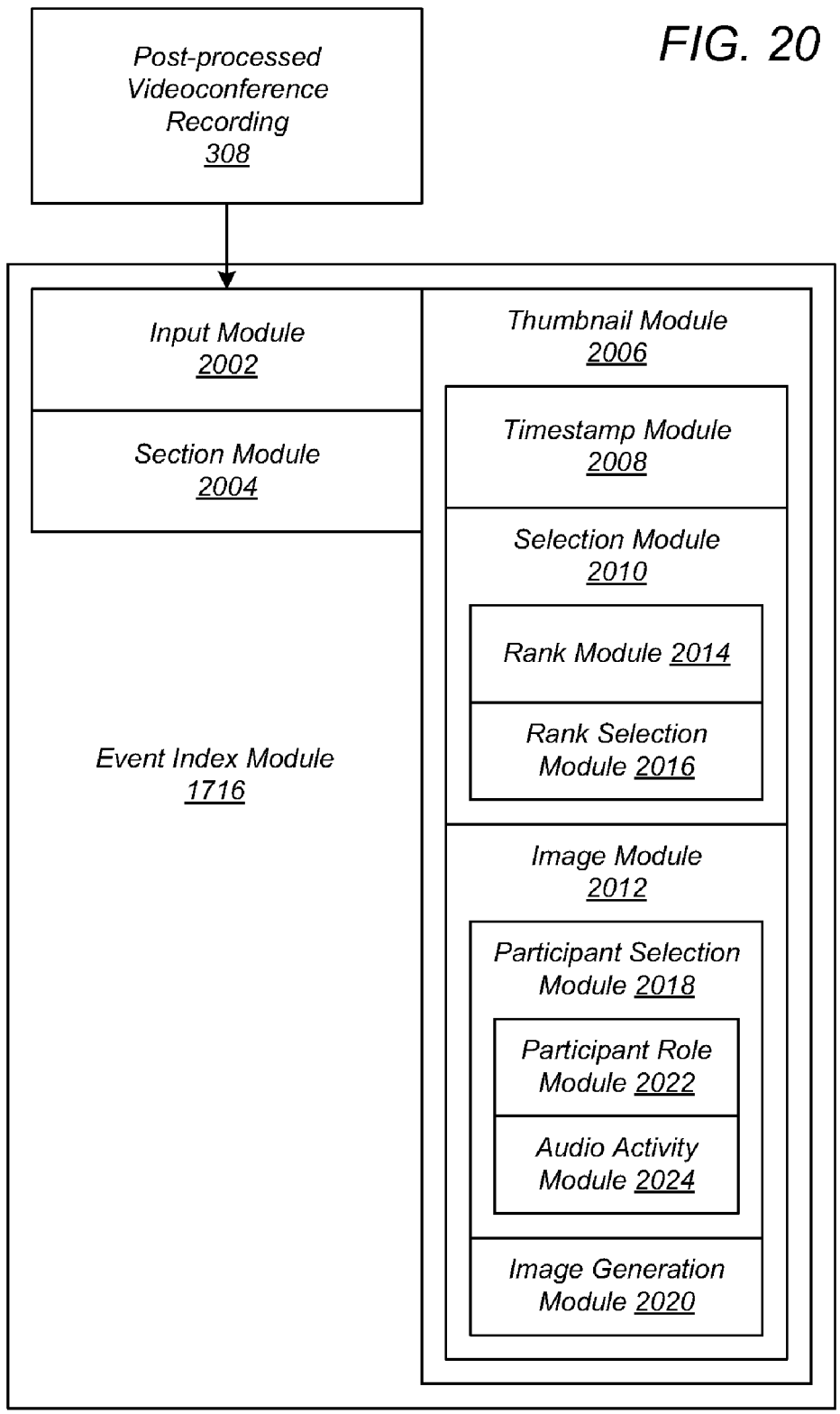
FIG. 20 shows detail of the event index module of FIG. 17 according to one embodiment.

Also in response to the playback command, event index module 1716 of videoconference playback module 310 generates a thumbnail index file 1718 (step 1805). FIG. 20 shows detail of event index module 1716 of FIG. 17 according to one embodiment. Referring to FIG. 20, event index module 1716 includes an input module 2002, a section module 2004, and a thumbnail module 2006. Thumbnail module 2006 includes a timestamp module 2008, a selection module 2010, and an image module 2012. Selection module 2010 includes a rank module 2014 and a rank selection module 2016. Image module 2012 includes a participant selection module 2018 and an image generation module 2020. Participant selection module 2018 includes a participant role module 2022 and an audio activity module 2024.

Figure 21:
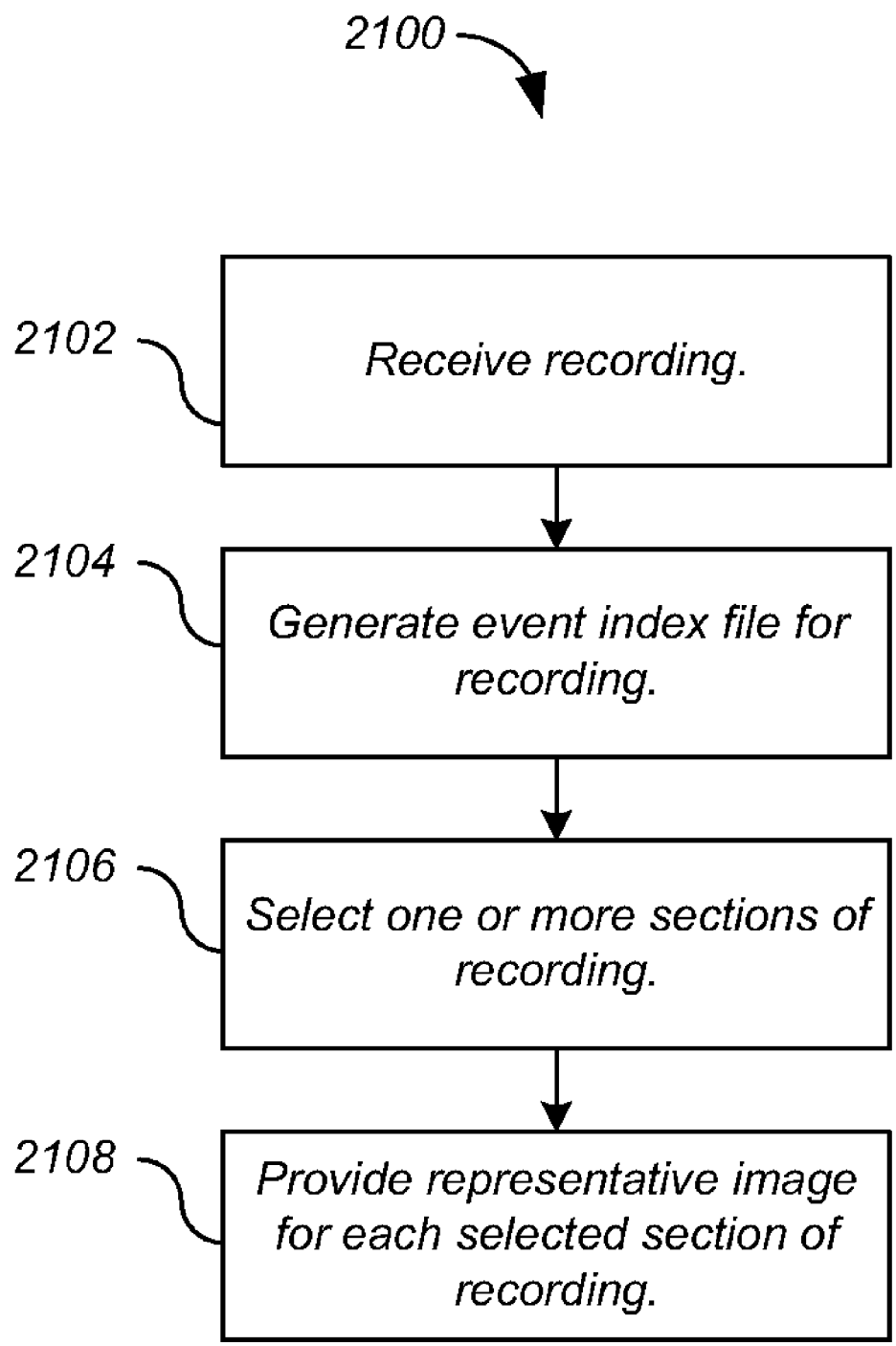
FIG. 21 shows a process for the event index module of FIG. 17 according to one embodiment.

FIG. 21 shows a process 2100 for event index module 1716 of FIG. 17 according to one embodiment. Although in the described embodiment, the elements of process 2100 are presented in one arrangement, other embodiments may feature other arrangements, as will be apparent to one skilled in the relevant arts based on the disclosure and teachings provided herein. For example, in various embodiments, some or all of the steps of process 2100 can be executed in a different order, concurrently, and the like.

Referring to FIGS. 20 and 21, input module 2002 of event index module 1716 receives a recording (step 2102). The recording includes a video file, and a plurality of event records each representing a respective event in the recording. For example, the recording can be post-processed videoconference recording 308 of FIG. 3, and the event records can be some or all of the records in index files 706 of FIG. 7. Each event record includes a timestamp representing a time of the event in the recording, and an image corresponding to the event. In some embodiments, the event records include the records in sideband session index file 706B and annotation index file 706D.

Figure 22:
FIG. 22 shows an event index file according to one embodiment.

Event index module 1716 then generates an event index file for the recording (step 2104). For example, event index module 1716 can generate the event index file by combining the events records in sideband session index file 706B annotation index file 706D. FIG. 22 shows an event index file 2200 according to one embodiment.

Referring to FIG. 22, event index file 2200 includes one or more event records 2202. Each event record 2202 includes a timestamp 2210, image data 2220, a format 2212 of image data 2220, a width 2214 and height 2216 of the image represented by image data 2220, and an attribute 2218 of image data 2220. Timestamp 2210 can represent the number of seconds elapsed between the start of the recording and the occurrence of the event represented by the event record 2202. Format 2212 can be an integer representing the format of image data 2220. Attribute 2218 can be an integer representing the source of the image, including for example video, application sharing, document camera, whiteboard, and the like.

Section module 2004 selects one or more sections of the recording (step 2106). For example, section module 2004 can divide the recording into a plurality of sections, and select the first section. The sections can be equal in length, but this is not required.

Each section will be represented by a representative image. Therefore, the number of sections can be determined by the area available to display the representative images. For example, when the representative images will be displayed in a web page, a large number of sections can be used, while when the representative images will be displayed in a small strip at the bottom of a media player interface, a relatively small number of sections can be used.

Thumbnail module 2006 provides a representative image, such as a thumbnail, for the selected section of the recording (step 2108). When multiple sections are used, thumbnail module 2006 provides a representative image for each section of the recording.

Figure 23:
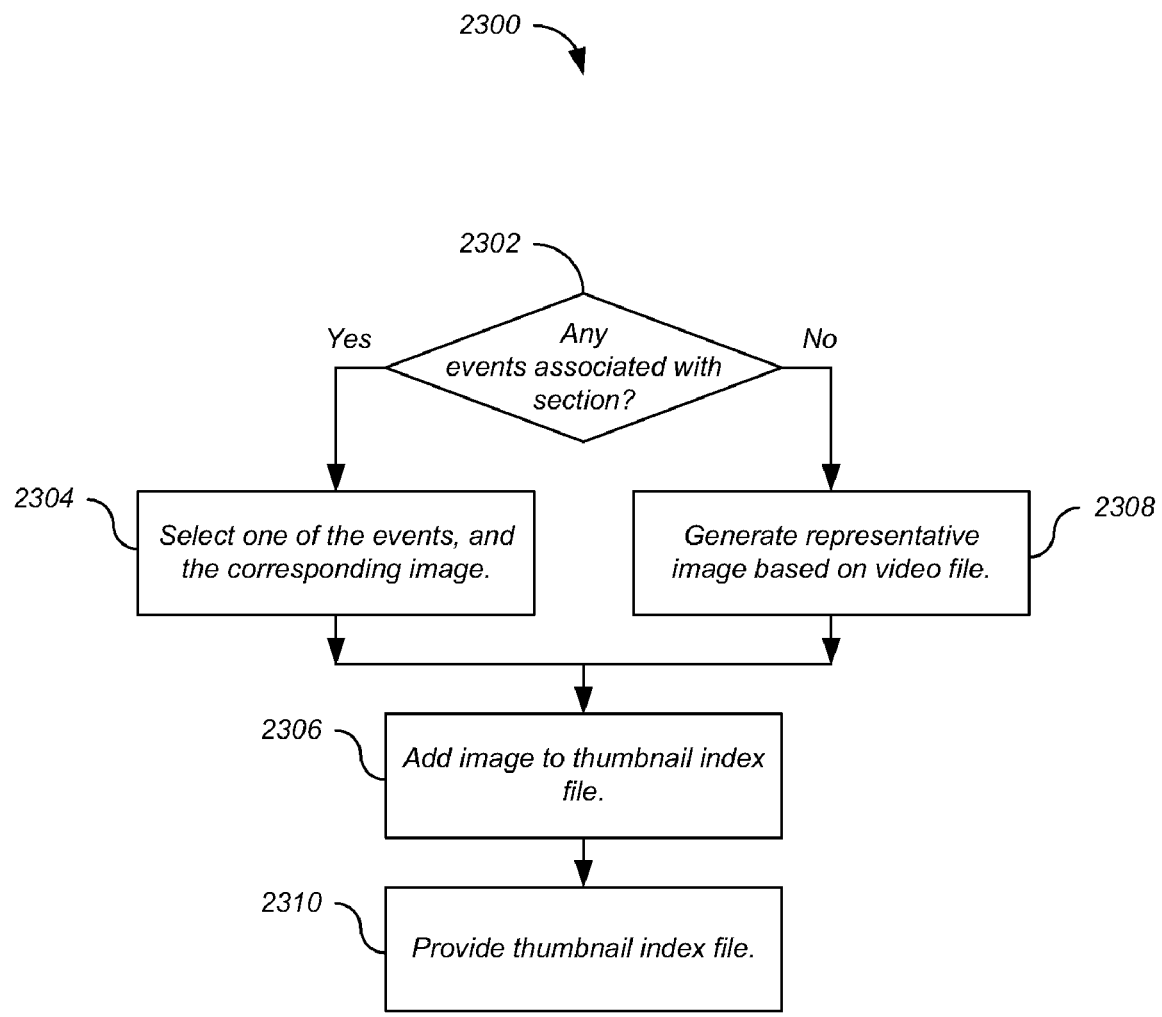
FIG. 23 shows a process for the thumbnail module of FIG. 20 to generate a representative image for a selected section of a recording according to one embodiment.

FIG. 23 shows a process 2300 for thumbnail module 2006 of FIG. 20 to generate a representative image for a selected section of a recording according to one embodiment. Although in the described embodiment, the elements of process 2300 are presented in one arrangement, other embodiments may feature other arrangements, as will be apparent to one skilled in the relevant arts based on the disclosure and teachings provided herein. For example, in various embodiments, some or all of the steps of process 2300 can be executed in a different order, concurrently, and the like.

Referring to FIGS. 20 and 23, timestamp module 2008 determines, based on the timestamps 2210 in event records 2202, whether any of the events are associated with the selected section (step 2302). For example, timestamp module 2008 compares the timestamps of event records 2202 to the time range of the selected section.

If any event records 2202 are associated with the selected section, selection module 2010 selects one of the event records 2202, and the corresponding image (step 2304). If only one event record 2202 is associated with the selected section, selection module 2010 selects that event record 2202, and the corresponding image. Thumbnail module 2006 then adds the selected event record 2202 to thumbnail index file 1718 (step 2306).

FIG. 24 shows a thumbnail index file 1718 according to one embodiment. Thumbnail index file 1718 can have the same format as event index file 2200. Referring to FIG. 24, thumbnail index file 1718 includes one or more event records 2402. Each event record 2402 includes a timestamp 2410, image data 2420, a format 2412 of image data 2420, a width 2414 and height 2416 of the image represented by image data 2420, and an attribute 2418 of image data 2420.

In the described embodiments, thumbnail module 2006 generates thumbnail index file 1718 by adding the event records 2202 selected by selection module 2010 to event index file 2200. However, other approaches are contemplated. For example, thumbnail module 2006 can generate thumbnail index file 1718 by removing event records 2202 not selected by selection module 2010 from event index file 2200, and the like.

If multiple event records 2202 are associated with the selected section, selection module 2010 selects one of those event record 2202, and the corresponding image. In particular, rank module 2014 assigns a rank to each of the events associated with the selected section according to a ranking scheme, and rank selection module 2016 selects the image corresponding to the event having the highest rank as the representative image. Thumbnail module 2006 then adds the selected event record 2202 to thumbnail index file 1718 (step 2306).

One approach to determining rank is based on events user activity. For example, load slide events and annotation events are ranked higher than remote desktop or document camera events. Load slide events indicate that a user has clicked on a document to load it for all users to see in the document window. Similarly, annotation events specify that a user is actively drawing on a whiteboard or annotating a document or image. In some embodiments, generation of remote desktop and document camera events is prompted by user actions such as mouse clicks and keyboard entries. In those embodiments, remote desktop and document camera events can have higher ranks.

In some cases, however, no event records 2202 are associated with the selected section. In those cases, image module 2012 generates a representative image based on the video file (step 2308), and then adds that representative image to thumbnail index file 1718. One approach is to find portions of the video file where a participant is actively working with the videoconference system. For example, participant selection module 2018 can select one of the participants based on participant connection index file 706E, participant count index file 706F, or the like. Image generation module 2020 then generates the representative image based on a portion of the selected section of the video file associated with the selected participant.

Participant selection module 2018 can select participants based on any number of criteria. For example, participant role module 2022 can select participants based on roles of the participants in the videoconference. For example, when a participant is designated as a presenter, participant role module 2022 can select that participant. As another example, audio activity module 2024 can select participants based on audio activity levels of the participants.

Once representative still images have been selected for each section of the video file, thumbnail index file 1718 is provided (step 2310). Thumbnail index file 1718 can be used to generate a display of the representative still images, for example in a web page, in a small strip at the bottom of a media player interface, and the like. The displayed representative still images can used to seek to a location in the recording. For example, when a user selects one of the representative images, the timestamp 2410 associated with that image can be used to seek to the location in the recording, for example as described above In some cases, the representative still images are based on key frames generated for whiteboards and annotations on images or documents. A number of inputs can be used to determine when a whiteboard or annotation key frame should be created. For example, one such input is a load slide event for either a whiteboard or annotation document. A load slide event is created when a participant clicks on an item in a tree containing all the items that are active for the meeting. When an item is clicked, the item is loaded into the document window for all users to view. When this event is seen during the post-processing of raw videoconference recording 304, and drawing items are present, a key frame is generated and added to command index file 706G.

As another example, a key frame is generated when a number of drawing objects have been created, or when a predetermined time interval has elapsed, since generation of the last key frame. In some embodiments, fixed thresholds can be used for the number of drawing objects and time interval. In other embodiments, a key frame is generated when the whiteboard/annotation page has changed in any significant way. As another example, a key frame is generated when a user issues an erase page command for the whiteboard/annotation page. Before this command is executed, a key frame is generated based on the current contents of the whiteboard/annotation page.

Key frames can also be generated for the remote desktop and document camera during the post-processing of raw videoconference recording 304. The remote desktop and document camera can use the same protocol for transmitting screen or camera updates to participants in a videoconference meeting. The process for creating these key frames can be based on time and the current command being processed. Screen or camera updates are sent in strings of commands each marked with one of the following: beginning, middle or end. Key frames are generated only on end commands because the string of commands must be complete. Once an end command is received, the time since the last key frame is determined. If a predetermined fixed time period has elapsed, a key frame is generated.

Referring again to FIG. 18, videoconference playback module 310 next sends connection initialization commands, including thumbnail index file 1718, to videoconference client 106 (step 1806). The connection initialization commands can include the recorded videoconference time, media item list 1200, participant data file 1406, and the like. Videoconference client 106 can then obtain any media items in media list 1200, as described above. Playback module 1706 of videoconference post-processing module 306 then starts playback of the recorded videoconference (step 1808) by starting transmission of the recorded A/V streams 406, and sending commands in post-processed command file 708, to videoconference client 106. The commands are sent in chronological order, based on the timestamps of the commands.

To seek to a new position in the recorded videoconference, videoconference client 106 can send a seek command to videoconference recording server 208 designating the seek time. If no seek commands are received from videoconference client 106 (step 1810), playback module 1706 simply continues playing the recorded videoconference from start to finish (step 1812). But if a seek command is received (step 1810), playback module 1706 seeks to the seek time, and resumes playback from the seek time.

In particular, videoconference playback module 310 stops the playback of the commands in post-processed command file 708 (step 1814), and then resynchronizes videoconference client 106. The resynchronization process includes sending a resynchronization start message to notify videoconference client 106 that the commands that follow are not part of the timed playback of the videoconference, but rather are to be used to resynchronize videoconference client 106 to the requested seek time.

Participant count index file 1502 is searched to determine the number of participants in the videoconference at the seek time (step 1816). If no participants were connected at the seek time, for example because the participants had taken a break, the seek time can be advanced to the next time at which one or more participants were connected to the videoconference, again using participant count index file 1502 (step 1818). Participant count index file 1502 can also be used to display the number and identity of the connected participants during playback, for example in a panel of a playback window of videoconference client 106.

Sideband session index file 902 is searched to determine if a sideband session was active at the seek time (step 1820). If so, the sideband session is initialized for playback (step 1822). In particular, videoconference playback module 310 retrieves the command offset 912 of the sideband session start command from sideband session index file 902, and uses command offset 912 to retrieve the sideband session start command from post-processed command file 708. Videoconference playback module 310 then sends the sideband session start command to videoconference client 106.

Next, screen buffer index file 1002 is searched to identify the screen buffer 1010, if any, immediately preceding the seek time. If such a screen buffer 1010 exists, videoconference playback module 310 retrieves the screen buffer 1010, generates a new command using the data in the screen buffer 1010, and sends the new command to videoconference client 106. Next, videoconference playback module 310 sends any screen update commands, from the time stamp of the screen buffer to the seek time, to videoconference client 106. If no screen buffer exists from the application sharing start time to the seek time, videoconference playback module 310 sends all the screen update commands, from the time of the session start to the seek time, to videoconference client 106. At this point the application sharing buffer at videoconference client 106 is synchronized up to the desired seek time.

Figure 19:
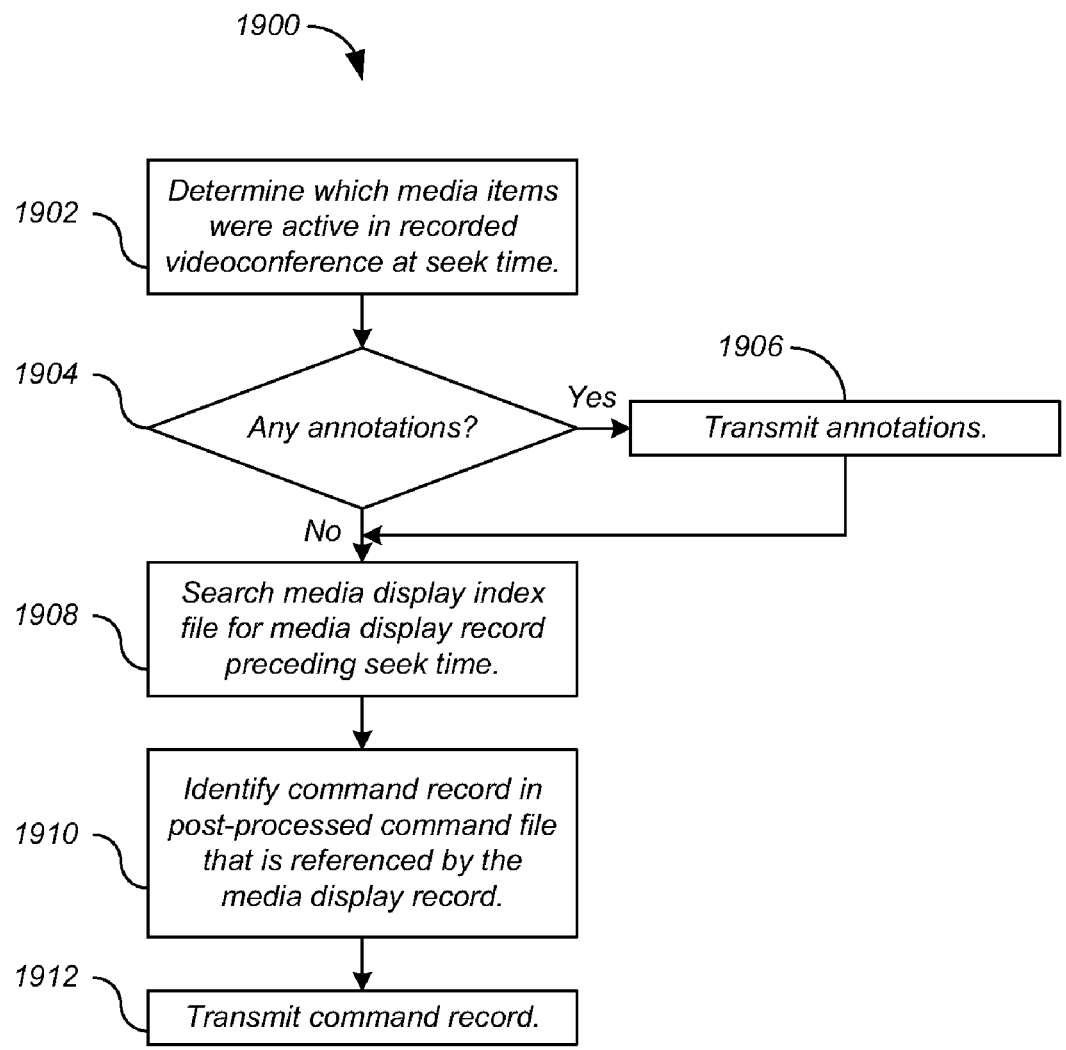
FIG. 19 shows a process for media initialization according to an embodiment of the present invention.

Next, any media active at the seek time is initialized (step 1824). FIG. 19 shows a process 1900 for media initialization according to an embodiment of the present invention. Although in the described embodiments, the elements of process 1900 are presented in one arrangement, other embodiments may feature other arrangements, as will be apparent to one skilled in the relevant arts based on the disclosure and teachings provided herein. For example, in various embodiments, some or all of the steps of process 1900 can be executed in a different order, concurrently, and the like.

Referring to FIG. 19, media items list 1200 is searched to determine which media items were active in the recorded videoconference at the seek time (step 1902). For each media item that is active at the seek time, annotation index file 1102 is searched for any annotations associated with the media item (step 1904). Each annotation found in annotation index file 1102 is read using the command offset 1112 in the corresponding annotation record 1108, and is sent to videoconference client 106 (step 1906).

Next, media display index file 1302 is searched to determine the media item displayed at the seek time in the videoconference. In particular, search module 1708 (FIG. 17) of videoconference playback module 310 (FIG. 3) searches media display index file 1302 for a media display record 1308 preceding the seek time (step 1908).

Select module 1710 identifies the command record 1306 in post-processed command file 708 that is referenced by the media display record 1308 (step 1910). Transmit module 1712 transmits command record 1306 to videoconference client 106 (step 1912).

Referring again to FIG. 18, videoconference playback module 310 transmits any further commands needed to resynchronize videoconference client 106 to the seek time (step 1826). For example, all of the commands between a predetermined command offset and the requested seek time can be sent. The predetermined command offset can be the greater of the command offset 1312 of the media display record 1308 sent in step 1910 and the command offset 912 of the sideband session start command in step 1822.

At this point, videoconference client 106 has been resynchronized to the requested seek time. Videoconference playback module therefore sends a command to videoconference client 106 indicating that the resynchronization process is complete (step 1828). Videoconference client 106 acknowledges the command. In response, play module 1714 plays the recorded videoconference starting at the seek time (step 1830). In particular, play module 1714 plays the audio and video streams of the videoconference, and transmits commands from post-processed command file 708, starting from the seek time.

Embodiments within the scope of the present invention can be implemented in digital electronic circuitry, computer hardware, firmware, software, or in combinations thereof. Embodiments can be implemented in computer-readable media embodying computer-executable instructions or data structures. Such computer-readable media can include any media which is accessible by a general-purpose or special-purpose computer system, and can include physical storage media, or any other media, which can embody computer-executable instructions or data structures, and which can be accessed by a general-purpose or special-purpose computer system. Physical storage media can include, for example, semiconductor memory devices such as RAM, ROM, EPROM, EEPROM, and flash memory devices; magnetic disks such as internal hard disks and removable disks; magneto-optical disks; optical disks such as CD-ROM, DVD; and the like. Any of the foregoing can be supplemented by, or incorporated in, ASICs (application-specific integrated circuits).

Method steps of the invention can be performed by a programmable processor executing a program of instructions to perform functions of the invention by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors can include both general-purpose microprocessors and special-purpose microprocessors.

A number of implementations of the invention have been described. Nevertheless, it will be understood that various modifications may be made without departing from the spirit and scope of the invention. Accordingly, other implementations are within the scope of the following claims.

What is claimed is:

1. Non-transitory computer-readable media embodying instructions executable by a computer to perform a method comprising:
 receiving a recording, wherein the recording includes
  a video file, and
  a plurality of event records each representing a respective event in the recording, wherein each event record includes
   a timestamp representing a time of the event in the recording, and
   an image corresponding to the event;
 selecting a section of the recording; and
 providing a representative image for the selected section of the recording, including
  determining, based on the timestamps, whether any of the events are associated with the selected section,
  selecting the image corresponding to one of the one or more events when one or more events are associated with the selected section, and generating the representative image based on the video file when no events are associated with the selected section.

2. The media of claim 1, wherein providing a representative image for the selected section of the recording comprises:
   assigning a rank to each of the one or more events according to a ranking scheme; and
   selecting, as the representative image, the image corresponding to the event having the highest rank.

3. The media of claim 1:
   wherein the recording represents a videoconference having a plurality of participants.

4. The media of claim 3, wherein generating the representative image based on the video file comprises:
   selecting one of the participants; and
   generating the representative image based on a section of the video file contributed by the selected participant.

5. The media of claim 4, wherein selecting the one of the participants comprises at least one of:
   selecting the one of the participants based on roles of the participants in the videoconference; and
   selecting the one of the participants based on audio activity levels of the participants.

6. An apparatus comprising:
   an input module adapted to receive a recording, wherein the recording includes
      a video file, and
      a plurality of event records each representing a respective event in the recording, wherein each event record includes
         a timestamp representing a time of the event in the recording, and
         an image corresponding to the event;
   a section module adapted to select a section of the recording; and
   a thumbnail module adapted to provide a representative image for the selected section of the recording, including
      a timestamp module adapted to determine, based on the timestamps, whether any of the events are associated with the selected section,
      a selection module adapted to select the image corresponding to one of the one or more events when one or more events are associated with the selected section, and
      an image module adapted to generate the representative image based on the video file when no events are associated with the selected section.

7. The apparatus of claim 6, wherein the thumbnail module comprises:
   a rank module adapted to assign a rank to each of the one or more events according to a ranking scheme; and
   a rank selection module adapted to select, as the representative image, the image corresponding to the event having the highest rank.

8. The apparatus of claim 6:
   wherein the recording represents a videoconference having a plurality of participants.

9. The apparatus of claim 8, wherein the image module comprises:
   a participant selection module adapted to select one of the participants; and
   an image generation module adapted to generate the representative image based on a portion of the selected section of the video file associated with the selected participant.

10. The apparatus of claim 9, wherein the participant selection module comprises at least one of:
    a participant role module adapted to select the one of the participants based on roles of the participants in the videoconference; and
    an audio activity module adapted to select the one of the participants based on audio activity levels of the participants.

11. An apparatus comprising:
    input means for receiving a recording, wherein the recording includes
       a video file, and
       plurality of event records each representing a respective event in the recording, wherein each event record includes
          a timestamp representing a time of the event in the recording, and
          an image corresponding to the event;
    section means for selecting a section of the recording; and
    thumbnail means for providing a representative image for the selected section of the recording, including
       timestamp means for determining, based on the timestamps, whether any of the events are associated with the selected section,
       selection means for selecting the image corresponding to one of the one or more events when one or more events are associated with the selected section, and
       image means for generating the representative image based on the video file when no events are associated with the selected section.

12. The apparatus of claim 11, wherein the thumbnail means comprises:
    rank means for assigning a rank to each of the one or more events according to a ranking scheme; and
    rank selection means for selecting, as the representative image, the image corresponding to the event having the highest rank.

13. The apparatus of claim 11:
    wherein the recording represents a videoconference having a plurality of participants.

14. The apparatus of claim 13, wherein the image means comprises:
    participant selection means for selecting one of the participants; and
    image generation means for generating the representative image based on a portion of the selected section of the video file associated with the selected participant.

15. The apparatus of claim 14, wherein the participant selection means comprises at least one of:
    participant role means for selecting the one of the participants based on roles of the participants in the videoconference; and
    audio activity means for selecting the one of the participants based on audio activity levels of the participants.

* * * * *